(12) United States Patent
Jimichi et al.

(10) Patent No.: US 9,712,070 B2
(45) Date of Patent: Jul. 18, 2017

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Takushi Jimichi, Chiyoda-ku (JP); Satoshi Azuma, Chiyoda-ku (JP); Kimiyuki Koyanagi, Chiyoda-ku (JP); Ritaka Nakamura, Chuo-ku (JP); Yasuhito Shimomura, Chuo-ku (JP); Yoshihito Kato, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 14/359,649

(22) PCT Filed: Jun. 4, 2013

(86) PCT No.: PCT/JP2013/065429
§ 371 (c)(1),
(2) Date: May 21, 2014

(87) PCT Pub. No.: WO2014/196013
PCT Pub. Date: Dec. 11, 2014

(65) Prior Publication Data
US 2015/0236603 A1 Aug. 20, 2015

(51) Int. Cl.
H02M 5/293 (2006.01)
H02M 5/458 (2006.01)
(Continued)

(52) U.S. Cl.
CPC ............. H02M 5/293 (2013.01); H02M 1/12 (2013.01); H02M 1/14 (2013.01); H02M 5/458 (2013.01)

(58) Field of Classification Search
CPC ...................................................... H02M 5/293
(Continued)

(56) References Cited

U.S. PATENT DOCUMENTS 4,594,634 A 6/1986 Schminke
5,245,522 A 9/1993 Kawaguchi et al.
(Continued)

FOREIGN PATENT DOCUMENTS

CN 1400731 A 3/2003
DE 198 32 226 A1 1/2000
(Continued)

OTHER PUBLICATIONS

International Search Report issued on Aug. 27, 2013 in PCT/JP2013/065429 filed on Jun. 4, 2013.
(Continued)

Primary Examiner — Jue Zhang
Assistant Examiner — Trinh Dang
(74) Attorney, Agent, or Firm — Oblon, McClelland, Maier & Neustadt, L.L.P.

(57) ABSTRACT

A power conversion device includes transformers provided with primary windings connected to input terminals and secondary windings including pluralities of single-phase open windings that are insulated to each other; a plurality of converter cells connected to the secondary windings of the transformers; and a control circuit for controlling ON/OFF of switching elements. The converter cells are each include a converter and the inverter that are provided with the switching elements, in which their input ends are connected to the respective single-phase open windings, so that the input ends are connected in mutually parallel fashion, through the transformers, to the input terminal of each phase, and in which their output ends are connected in
(Continued)

mutually serial fashion to an output terminal of each phase, to thereby perform three or more-level power conversion.

16 Claims, 20 Drawing Sheets

(51) Int. Cl.
*H02M 1/12* (2006.01)
*H02M 1/14* (2006.01)

(58) Field of Classification Search
USPC .......................................................... 363/37
See application file for complete search history.

(56) References Cited

U.S. PATENT DOCUMENTS

| | | | |
|---|---|---|---|
| 5,625,545 A | 4/1997 | Hammond | |
| 5,969,966 A | 10/1999 | Sawa et al. | |
| 6,236,580 B1* | 5/2001 | Aiello | H02M 5/45 363/37 |
| 6,313,600 B1* | 11/2001 | Hammond et al. | H02P 5/28 318/798 |
| 2010/0102762 A1* | 4/2010 | Sugimoto | H02M 7/49 318/376 |
| 2011/0013428 A1* | 1/2011 | Abolhassani | H02M 7/49 363/37 |
| 2011/0280049 A1* | 11/2011 | Mori | H02M 1/4216 363/25 |
| 2012/0033472 A1* | 2/2012 | Oka | H02P 13/00 363/127 |
| 2012/0106223 A1 | 5/2012 | Janning et al. | |
| 2012/0163046 A1* | 6/2012 | Hibino | H02P 27/08 363/37 |
| 2013/0121041 A1 | 5/2013 | Schroeder et al. | |
| 2013/0155736 A1* | 6/2013 | Ilic | H02M 7/72 363/71 |
| 2013/0258729 A1* | 10/2013 | Barbosa | H02M 5/14 363/71 |
| 2014/0300298 A1* | 10/2014 | Liu | H02P 3/22 318/380 |

FOREIGN PATENT DOCUMENTS

| | | |
|---|---|---|
| JP | 04-188206 A | 7/1992 |
| JP | 04-271281 A | 9/1992 |
| JP | 05-043734 U | 6/1993 |
| JP | 06-090565 A | 3/1994 |
| JP | 2000-050636 A | 2/2000 |
| JP | 2000-184736 A | 6/2000 |
| JP | 2000-228883 A | 8/2000 |
| JP | 2005-045999 A | 2/2005 |
| JP | 2009-106081 A | 5/2009 |
| JP | 2010-148157 A | 7/2010 |
| JP | 2013-042610 A | 2/2013 |
| RU | 2 402 146 C1 | 10/2010 |
| SU | 1351525 A3 | 11/1987 |
| WO | WO 2011/111262 A1 | 9/2011 |

OTHER PUBLICATIONS

Office Action issued Sep. 30, 2014 in Japanese Patent Application No. 2012-023570 (with partial English language translation).
Russian Office Action dated Jan. 15, 2016 of the corresponding Russian patent application No. 2014133045/07(053224), and the partial English translation thereof.
Extended European Search Report dated Apr. 12, 2016 issued in the corresponding European Patent Application No. 13872277.2.
Albert Martin Ruban A., et al., "Real Time Harmonic Elimination PWM Control for Voltage Source Inverters", 2012 International Conference on Advances in Engineering, Science and Management (ICAESM 2012), Nagapattinam, Tamil Nadu, India, Mar. 30-31, 2012, IEEE, Piscataway, NJ, Mar. 30, 2012, pp. 479-484.
Office Action issued Aug. 1, 2016 in Chinese Patent Application No. 201380009116.5 (with English language translation).
Office Action issued in European Application No. 13 872 277.2 on Feb. 8, 2017.
Office Action issued Mar. 29, 2017 in Chinese Patent Application No. 201380009116.5 (with English translation).

* cited by examiner (a)    (b)

(a)

(b)

(a)

(b)

POWER CONVERSION DEVICE

TECHNICAL FIELD

This invention relates to a power conversion device for converting an AC power to another AC power, and relates, for example, to that to be applied as a device for driving a motor in a speed-variable manner.

BACKGROUND ART

In FIG. 17, an example of circuit configuration of a first conventional power conversion device is shown. For the purpose of achieving a high-voltage output voltage to a motor connected to an output terminal, the power conversion device of FIG. 17 has a plural number of single-phase converters whose respective AC terminals are serially connected to each other. For the purpose of supplying power to the plural number of single-phase converters, a plurality of mutually-insulated DC power sources are formed by a transformer having plural windings and a plural number of diode rectifiers, and are connected to DC sections of the single-phase converters. Meanwhile, for the purpose of suppressing a harmonic current in the input side, the transformer is given as a transformer (phase-shifting transformer) including plural windings 3 to 11 whose phases are shifted to each other (see, for example, Patent Document 1).

On the other side, in FIG. 18, an example of circuit configuration of a second conventional power conversion device is shown. The power conversion device of FIG. 18 has a circuit configuration that is multiplexed using a plural number of three-phase converters having a common DC voltage and a plural number of three-phase transformers, in which secondary windings of the transformers are serially connected as open windings to each other (see, for example, Patent Document 2).

Furthermore, in FIG. 19, an example of circuit configuration of a third conventional power conversion device is shown. In the power conversion device of FIG. 19, each of single-phase transformers is connected at its primary side to other of the single-phase transformers in multi-serial fashion, and the serial ends are connected to input terminals, while a converter cell having a single-phase full-bridge converter/inverter that is configured, as shown in FIG. 20, with legs capable of outputting a two-level voltage, is connected to the secondary winding of each of the single-phase transformer. The AC output terminal of each inverter is connected to the AC output terminal of each other inverter in multi-serial fashion (see, for example, Patent Document 3).

CITATION LIST

Patent Document

Patent Document 1: U.S. Pat. No. 5,625,545 (FIG. 1)
Patent Document 2: Japanese Patent No. 3019655 (FIG. 1)
Patent Document 3: Japanese Patent Application Laid-open No. 2009-106081 (FIG. 1, FIG. 2)

SUMMARY OF THE INVENTION

Problems to be Solved by the Invention

In the first power conversion device of FIG. 17, for the purpose of suppressing the harmonic current in the input side, the transformer (phase-shifting transformer) including plural windings whose phases are mutually shifted, is required. Since this kind of transformer is structurally complicated, there is a problem of being large in size and high in cost. Further, there is also a drawback that power flow is restricted in one direction by the diode rectifiers.

Further, in the second power conversion device of FIG. 18, since the transformers are used in the output side, it is supposed that, when a motor or like load that requires voltage change is connected in the output side, its operation may be limited due to fear of magnetic saturation of the transformer. Specifically, such a case is considered where the power conversion device can not output a low-frequency voltage. Meanwhile, in order to form a common DC power source, such a configuration of a self-commutated converter or the like that utilizes diode rectifiers and switching elements, is considered; however, in the case of forming the DC power source from a high voltage power source, there is supposed a problem that an additional transformer, particularly, a phase-shifting transformer for the purpose of reducing a harmonic current, becomes required.

Furthermore, in the third power conversion device of FIG. 19, since the self-commutated converters are used, a bidirectional power flow is enabled, whereas, since single-phase transformers are used, the number of the transformers increases. Further, since the single-phase transformers are directly serially connected, there is a possibility that the primary-side voltage of the transformer is not adequately divided in voltage when no voltage is output by the converter. In Patent Document 3, there is a statement that a three-phase transformer with a five-leg core is used in place of the single-phase transformer.

However, even if the five-leg core is used, since core sectional areas of the fourth and fifth legs on which no windings are provided are finite, there is concern that the magnetic saturation emerges if controlling is taken without consideration of the magnetic saturation. No way is publicly known to control an input current, an output voltage, and a DC bus voltage for each converter cell while preventing the magnetic saturation, and thus there is concern for the reliability. Additionally, the legs capable of outputting a two-level voltage is used in the converter cell, there is a drawback that an output voltage per one cell is low, so that the number of the converter cells and the number of the transformers increase.

This invention has been made to solve the problems as described above, and an object thereof is to provide a power conversion device with high reliability, small size, light weight and low cost, and capable of performing regeneration operation as well, while not requiring such a structurally-complicated phase-shifting transformer, and suppressing increase in the number of the transformers.

Means for Solving the Problems

A power conversion device according to the invention is a power conversion device which performs power conversion between input terminals of multi-phase AC and output terminals of multi-phase AC, comprising: a voltage-transformer device including primary windings connected to the input terminals and secondary windings comprising pluralities of single-phase open windings that are insulated to each other; a plurality of converter cells including switching elements, in which their input ends are connected to the respective single-phase open windings, and their output ends are connected in mutually serial fashion to the output terminal of each phase, said converter cells each performing conversion between a single-phase AC and another single-phase AC; and a control circuit for controlling ON/OFF of the switching elements. Further, the converter cells each comprise: a capacitor series connection; a converter that converts a single-phase AC voltage from the input terminals into a three or more-level DC voltage and outputs it to the capacitor series connection; and an inverter that converts a DC voltage from the capacitor series connection into a single-phase AC voltage and outputs it to the output ends.

Effect of the Invention

The power conversion device according to the invention is configured as described above, so that the voltage-transformer device can be configured with a simple and light-weight structure. Further, since the converter cell is enabled to improve a voltage waveform and to accept a high-voltage specification, it is possible to suppress the generation of a harmonic component and to reduce the required number of the cells, to thereby achieve a power conversion device with small size, light weight and low cost.

MODES FOR CARRYING OUT THE INVENTION

Embodiment 1

Figure 1:
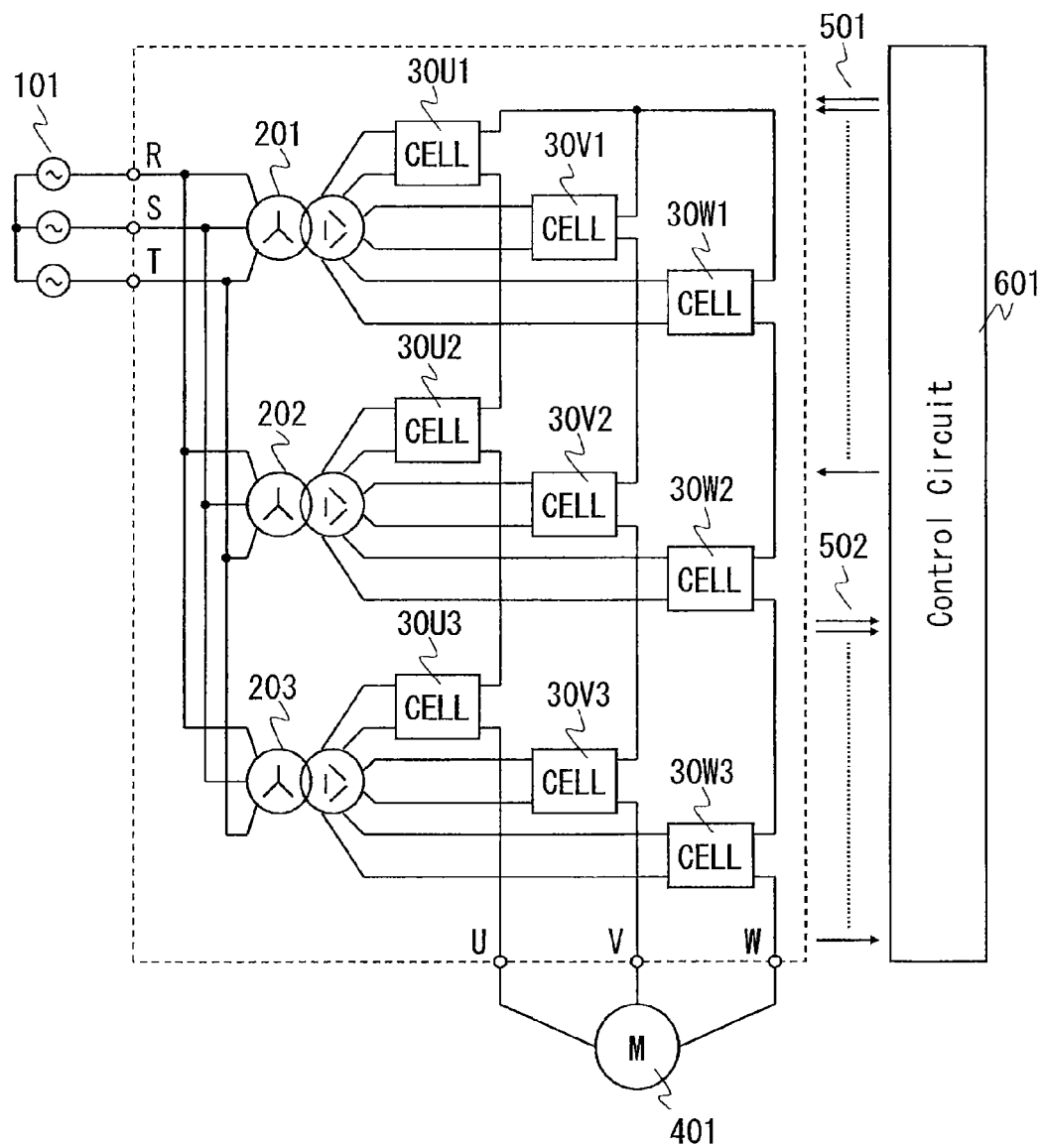
FIG. 1 is a circuit diagram showing a main circuit configuration of a power conversion device according to Embodiment 1 of the invention.

In FIG. 1, an example of main circuit configuration of a power conversion device according to Embodiment 1 of the invention is shown. FIG. 1 shows a case where a three-phase voltage source 101 is connected to input terminals R, S, T of the power conversion device, and a three-phase motor 401 is connected to output terminals U, V, W. That is, FIG. 1 show a case where the power conversion device according to the invention is used as a motor drive device.

The main circuit of the power conversion device according to Embodiment 1 of the invention is configured with a voltage-transformer device comprising a plurality of transformers $20n$ (n=1, 2, 3 . . . ), and a plurality of converter cells $30Xn$ (X=U, V, W . . . , n=1, 2, 3 . . . ). In this invention, each multi-phase alternating current (AC) applied to the input terminals and the output terminals is not limited to a three-phase AC. The invention of this application is also applicable to a circuit which includes, for example, three number of two-phase/two-phase transformers and six number of converter cells, so as to convert the two-phase AC coming through its input terminals into a three-phase AC and outputs it through its output terminals. Further, a serially-connected number of the converter cells is not limited to three.

For the example in FIG. 1 of Embodiment 1, description will be made below assuming that both the voltage source 101 and the motor 401 are of three-phase AC type, and three number of transformers 201, 202, 203 and three number of converter cells per one phase, i.e. total nine number of converter cells 30U1, 30U2, 30U3, 30V1, 30V2, 30V3, 30W1, 30W2, 30W3 are used. In addition, a control circuit 601 that controls ON/OFF of switching elements in the power conversion device is included therein.

FIG. 2(a) is a diagram showing an example of winding configuration of the transformer $20n$, a detailed configuration of which is shown in FIG. 2(b). Primary windings of the transformer $20n$ have a winding configuration of three-phase star connection (Y-connection) whose respective terminals are connected to the input terminals R, S, T of the power conversion device. Note that although a delta connection (Δ-connection) may be used for the primary windings, if the total sum of voltages applied to the secondary windings of the transformer $20n$ is not zero, a circulation current flows in the delta connection, to thereby increase a loss. Thus, it is desirable that the primary windings have a star-connection, not the other.

Figure 17:
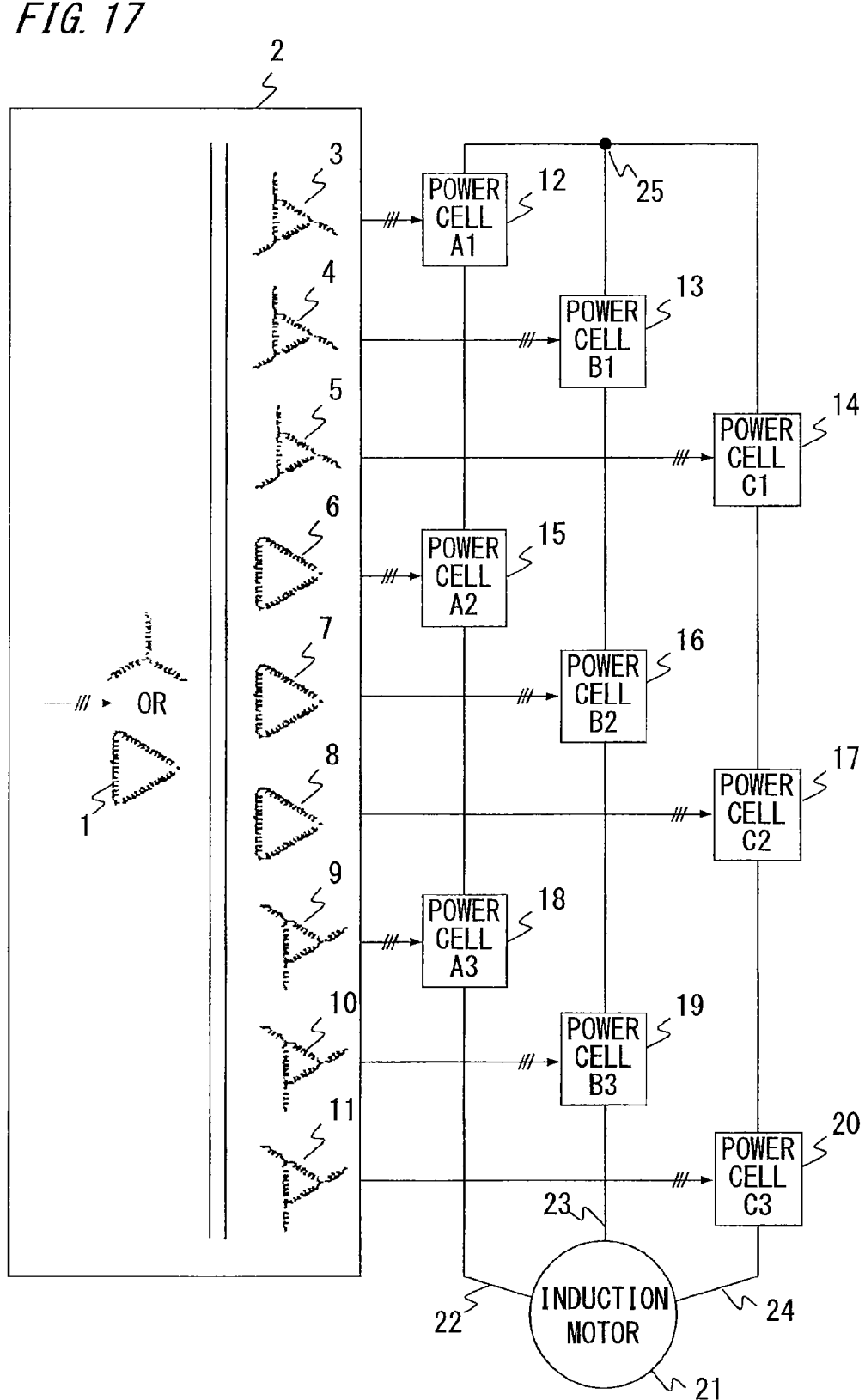
FIG. 17 is a circuit diagram showing an example of circuit configuration of a first conventional power conversion device.
Figure 18:
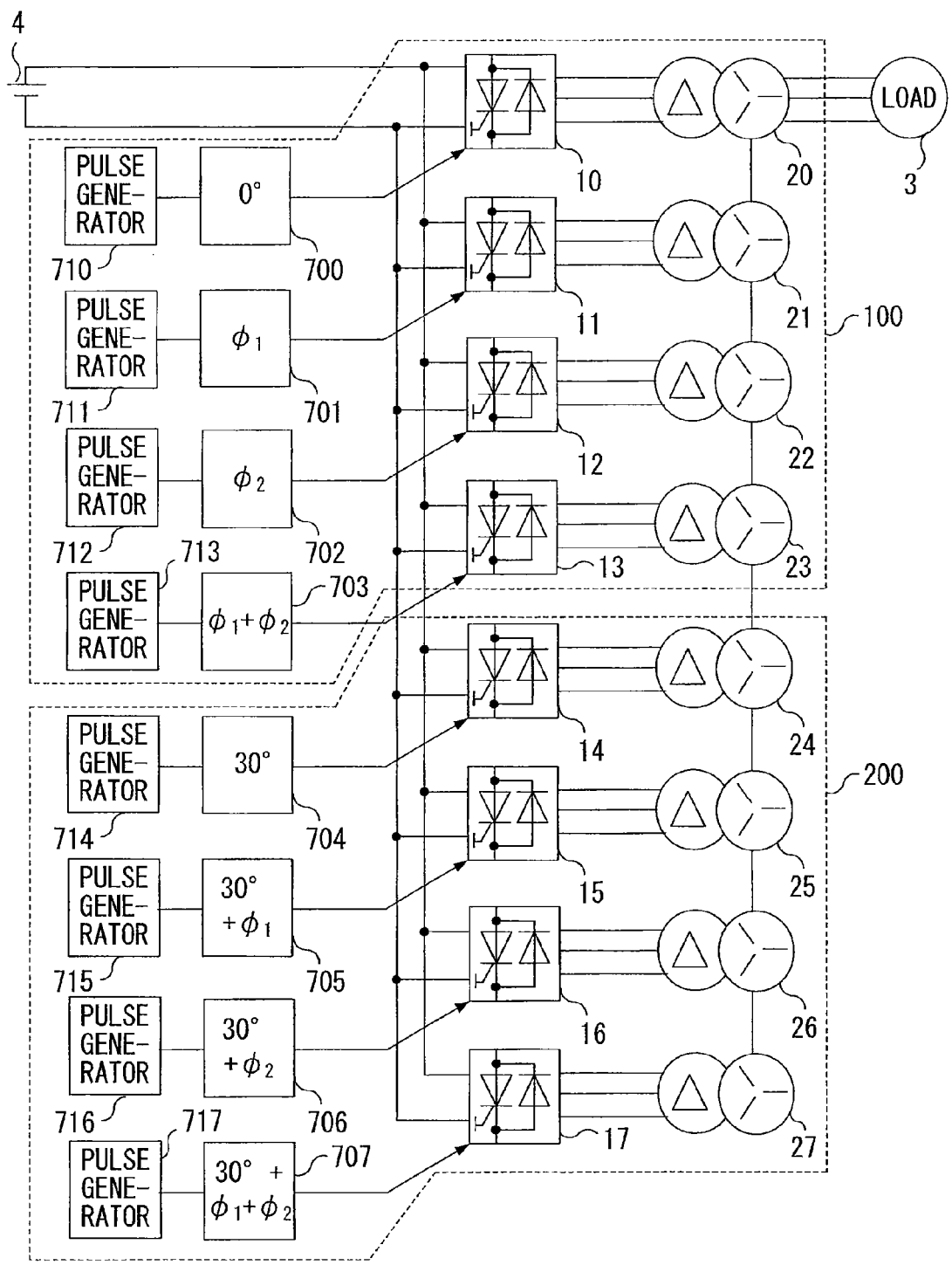
FIG. 18 is a circuit diagram showing an example of circuit configuration of a second conventional power conversion device.
Figure 19:
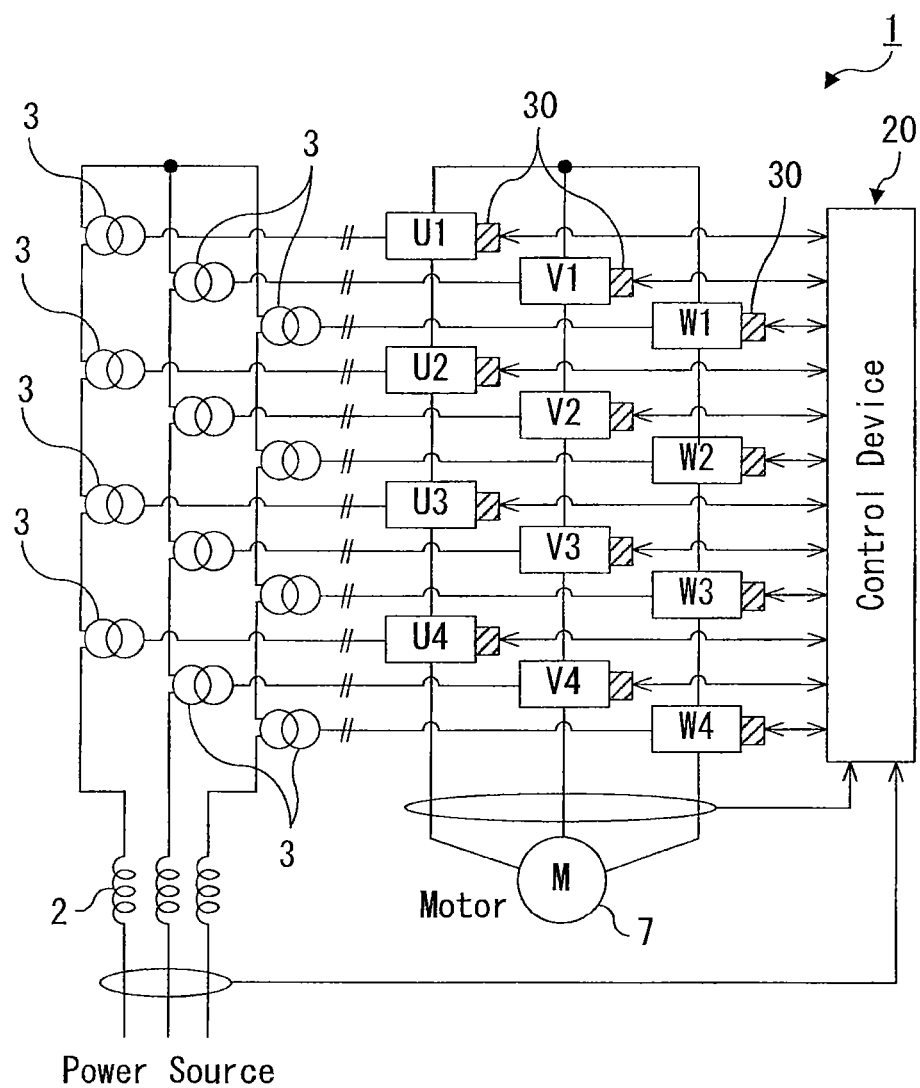
FIG. 19 is a circuit diagram showing an example of circuit configuration of a third conventional power conversion device.
Figure 20:
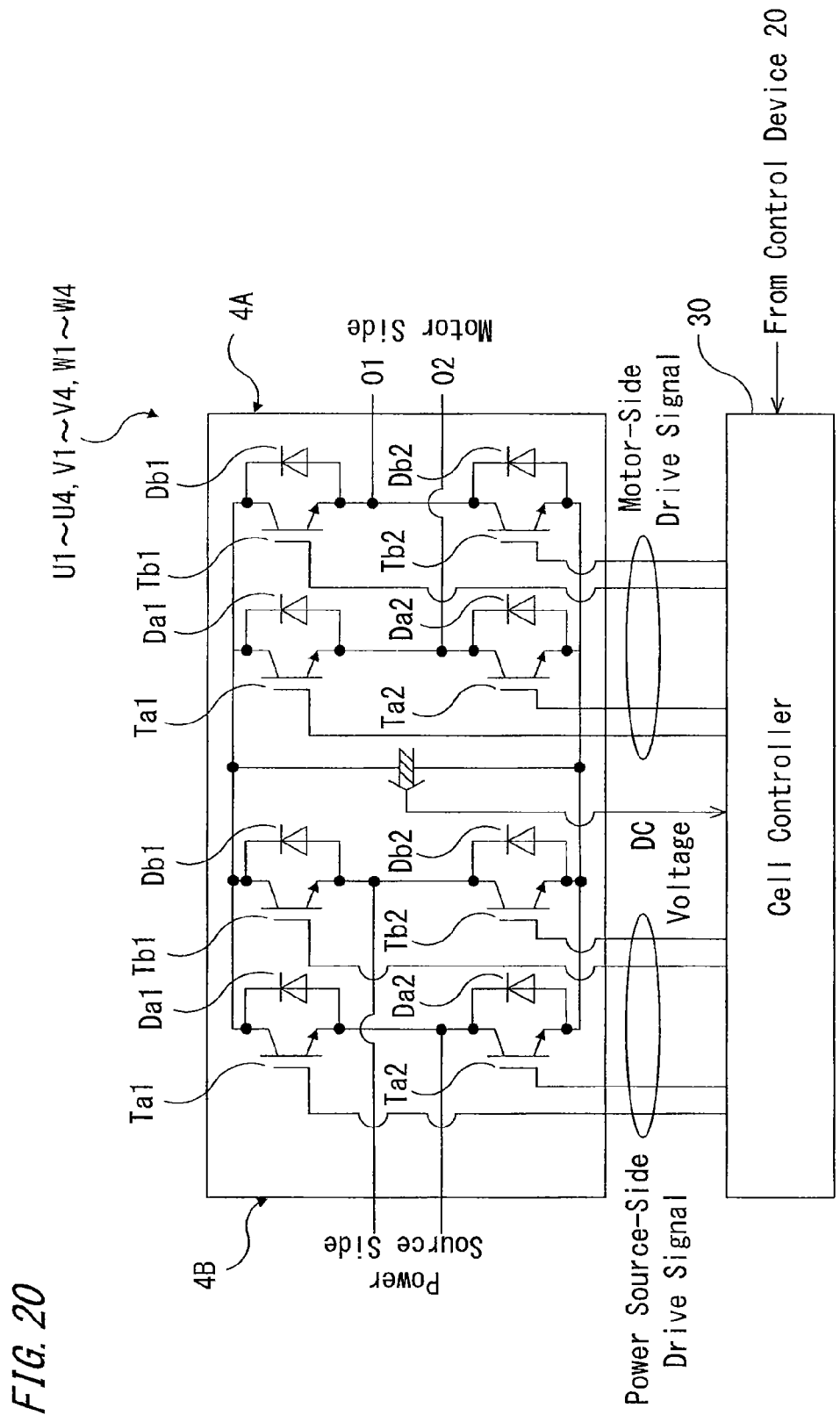
FIG. 20 is a circuit diagram showing a converter cell of the third conventional power conversion device.

Secondary windings comprises pluralities single-phase open windings that are insulated to each other. In the secondary windings, voltages depending on the turn ratio are generated between Rs-Na, between Ss-Nb, and between Ts-Nc, according to voltages between the terminals R, S, T in the primary side and a neutral point N of the star connection, that is, the voltages between R-N, between S-N, and between T-N. Because the secondary windings comprise the open windings, one insulated-voltage source is formed per one secondary winding. Thus, for the purpose of forming one insulated-voltage source, it does not require to have three or more secondary windings, as the first conventional power conversion device shown in FIG. 17 does.

Note that, for the purpose of realizing an input-current control unit 610 described later, it is desirable that a total leakage inductance of the primary winding and the secondary winding be designed to have a percent impedance of 5% or more.

Controllability of the current is mostly related to a percent impedance (inductance component in the output side of the converter cell 30Xn) and a switching frequency; the higher the either one of them becomes, the more the controllability is enhanced. That is, the percent impedance becomes an important factor to determine the controllability of the current. In consideration of a target voltage class/capacity range (for example, 6.6 kV, 1 MVA), the switching frequency is generally restricted to some extent, and thus, as the percent impedance, about 5% to 10% is appropriate.

Meanwhile, as the core of the transformer 20n, a three or more-leg core is used. When windings are wound around the respective legs of the three-leg core, if a total voltage of the windings is not zero, there is a risk of causing magnetic saturation. Thus, it is desirable to use a four-leg or five-leg core. However, since the effective sectional area of the additional leg (fourth leg or fifth leg) is finite, it is necessary at the control circuit 601 described later, to take a control in consideration of not causing the magnetic saturation.

Figure 3:
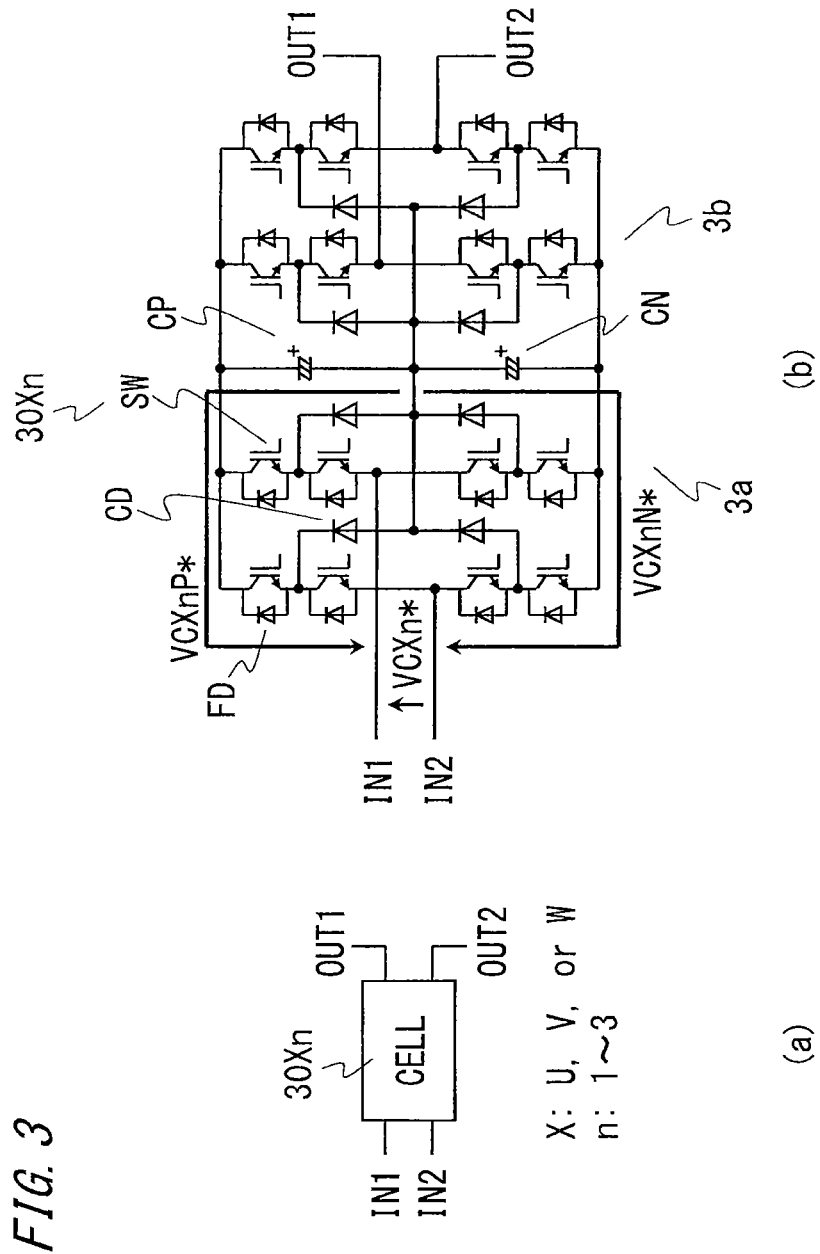
FIG. 3 is circuit diagrams each showing a main circuit configuration of a converter cell according to Embodiment 1.

A detailed configuration of the main circuit of the converter cell 30Xn shown in FIG. 3(*a*), is shown in FIG. 3(*b*). The converter cell 30Xn has a converter 3a and an inverter 3b each being of a single-phase full-bridge type and having legs capable of outputting voltages of three levels or more, and performs conversion between a single-phase AC and another single-phase AC. The DC terminals of the converter 3a and the DC terminals of the inverter 3b are connected to a capacitor series connection CP-CN, respectively. The example of the converter cell 30Xn shown in FIG. 3, is based on the circuit of a diode-clamp type three-level converter in which switching elements SW with their respective free-wheel diodes FD inversely-parallel connected thereto, are connected in four series, and connected to a neutral point by each clamp diode CD.

The diode-clamp type three-level converter utilizes four legs. Among these four legs, two legs are operated as the converter 3a.

Figure 2:
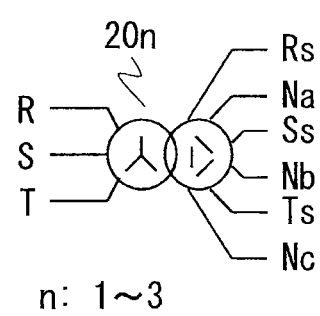
FIG. 2 is diagrams each showing a winding configuration of a transformer according to Embodiment 1.
Figure 2:
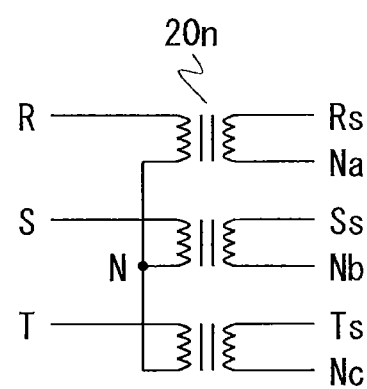

AC terminals IN1 and IN2 of the converter 3a, which are input ends of the converter cell 30Xn, are connected to one secondary-side winding of the transformer 20n, for example, the single-phase open winding in FIG. 2, at its both ends Rs and Na. Thus, the respective input ends of the converter cells 30Xn are connected in mutually parallel fashion to the input terminal of each phase, through the transformers 20n. For example, the input ends of converter cells 30U1, 30U2, 30U3 are connected in mutually parallel fashion to the input terminal of R-phase through the transformers 201, 202, 203.

The other two legs are operated as the inverter 3b. Output terminals OUT1 and OUT2 of the inverter 3b, which are output ends of the converter cell 30Xn, are serially connected to the output terminals of the other converter cells 30Xn of the same phase, and the three phases are star-connected while each phase is connected to each of the output terminals U, V, W of the power conversion device.

Thus, the output ends of the converter cell 30Xn are connected in mutually serial fashion to the output terminal of each phase. For example, the output ends of the converter cells 30U1, 30U2, 30U3 are connected in mutually serial fashion and are connected serially to the output terminal of U-phase.

The phase of the output terminal to which the output ends (inverter 3b-side) of the mutually serially-connected converter cell 30Xn are connected, is the same as the phase of the input terminal to which the input ends (converter 3a-side) of the said converter cell 30Xn is connected. That is, the input-side R phase is the same as the output-side U phase, the input-side S phase is the same as the output-side V phase, and the input-side T phase is the same as the output-side W phase.

To both ends of the legs, the capacitor series connection CP-CN, which is a series connection of a positive-side capacitor CP and a negative-side capacitor CN, is connected. Hereinafter, the voltage applied between both ends of the capacitor series connection CP-CN is defined as a DC bus voltage, the voltage applied to the positive-side capacitor CP is defined as a positive-side DC bus voltage, and the voltage applied to the negative-side capacitor CN is defined as a negative-side DC bus voltage.

Since the power conversion device of the invention is made with the circuit configuration as described above, there are provided the following advantages. Because of using the converter cell 30Xn being a self-commutated inverter, it is possible to suppress a harmonic current in the input side by controlling ON/OFF of the switching devices SW in the converter 3a-side. Thus, a phase-shifting transformer, which is complicated in structure, large in size and high in cost, is unnecessary. Further, because of using the single-phase open windings as the secondary windings of the transformer 20n, it is possible to establish many voltage sources insulated to each other by a smaller number of windings. Furthermore, it is possible to make the voltage higher by using the legs capable of outputting voltages of three levels in the converter cell 30Xn, so that the number of the cells can be reduced, and in addition, the number of the secondary windings of the transformer 20n can be decreased.

In particular, because of using the legs capable of outputting voltages of three levels, there is provided a merit that the number of the converter cells 30Xn is reduced to half as compared to the case of using the leg capable of outputting voltages of two levels. Reduction to half of the number of converter cells 30Xn makes half the required number of the insulated power sources, so that the number of the windings of the transformers 20n can be reduced to half. Further, because of using the legs capable of outputting voltages of three levels, a harmonic component in the output voltage or current is reduced. This reduction of the harmonic component provides an additional merit on the circuit configuration of the invention. Its reason is that a loss in the transformer 20n is reduced because a harmonic voltage applied to or harmonic current flowing through the transformer 20n is reduced. Thus, it is possible to achieve further reduction in weight and size of the transformer 20n, which results also in contribution to energy saving.

Meanwhile, recently, there has been realized a single module in which a group of semiconductor elements are stored which includes a leg capable of outputting voltages of three levels, that is, the leg comprising four numbers of switching elements SW and free-wheel diodes FD, and two clamp diodes CD. Thus, even the leg capable of outputting voltages of three levels is applied, it is possible to make one converter cell 30Xn little in size-difference from that in the case of two levels. That is, it is possible to reduce the volume, weight, and cost of the power conversion device as a whole, by an extent corresponding to the reduced number of the converter cells 30Xn*.

Next, the control circuit 601 will be described. The control circuit 601 has three main purposes, which are: to make closer the current flowing through the input terminal to an ideal sine wave (to reduce harmonic waves); to control the motor 401 to have an intended rotation speed or torque; and to control the DC bus voltages of the conversion cells 30Xn to have proper values to thereby prevent the semiconductor elements from causing overvoltage breakdown. Using detection values of the current flowing through the input terminal or the conversion cell 30Xn of the power conversion device, the voltage at the input terminal of the power conversion device, and/or the DC bus voltages of the conversion cells (three voltages of the positive-side DC bus voltage, the negative-side DC bus voltage and a total voltage of both of them), the control circuit 601 finally develops gate signals for controlling ON/OFF of the switching elements SW of the converter cell 30Xn.

Figure 4:
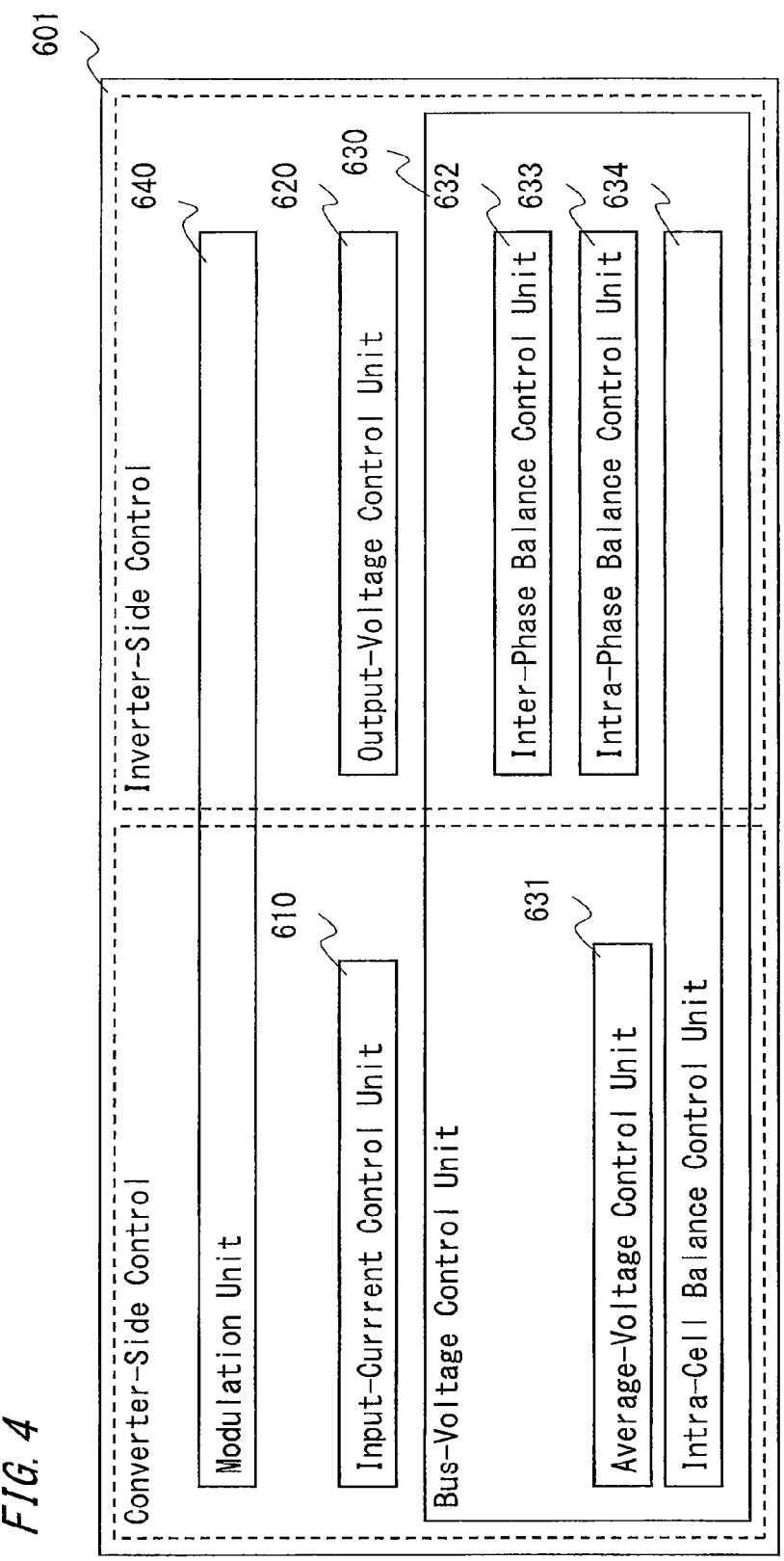
FIG. 4 is a drawing illustrating an internal configuration of a control circuit according to Embodiment 1.

An internal configuration of the control circuit 601 is shown in FIG. 4. The control circuit 601 includes four control units of the input-current control unit 610, an output-voltage control unit 620, a bus-voltage control unit 630, and a modulation unit 640; further, the bus-voltage control unit 630 has an average-voltage control unit 631, an inter-phase balance control unit 632, an intra-phase balance control unit 633, and an intra-cell balance control unit 634.

The processing by the input-current control unit 610 is reflected in controlling in the converter 3a-side, and the processing by the output-voltage control unit 620 is reflected in controlling in the inverter 3b-side. Further, in the bus-voltage control unit 630, the processing by the average-voltage control unit 631 is reflected in controlling in the converter 3a-side, the processing by inter-phase balance control unit 632 is reflected in controlling in the inverter 3b-side, and the processing by the intra-phase balance control unit 633 is reflected in controlling in the inverter 3b-side. Also, the processing by the intra-cell balance control unit 634 is reflected in controlling in both or either one of the converter 3a-side and the inverter 3b-side. The processing by the modulation unit 640 is finally reflected in controlling the switching elements SW in the converter 3a-side and the inverter 3b-side.

Before describing a detail of the control circuit 601, respective parameters are defined. First, the voltages at the input terminals R, S, T (power source voltages) are defined as Vr, Vs, Vt, and the currents flowing through the input terminals R, S, T are defined as Ir, Is, It. The currents flowing in the secondary side of the transformers 20n are defined as IRsn, ISsn, ITsn. Note that "n" is defined as n=1, 2, 3 corresponding to the order of the transformers 201, 202, 203. The DC bus voltages in the conversion cells 30Xn are defined as VdcXn, where "X" is one of U, V, and W, and "n" is one of 1, 2 and 3.

Further, voltage command values in the converter 3a-side of the converter cells 30Xn, are defined as VCXn*, among which the voltage command values for the switching elements SW of the leg that outputs a voltage to the positive-side AC terminal IN1 (hereinafter, referred to as positive-side leg) are defined as VCXnP*, and the voltage command values for the switching elements SW of the leg that outputs a voltage to the AC terminal IN2 (hereinafter, referred to as negative-side leg) are defined as VCXnN* (see, FIG. 3(b)). Likewise, voltage command values in the inverter 3b-side are defined as VIXn*, among which the voltage command values for the switching elements SW of a positive-side leg are defined as VIXnP*, and the voltage command values for the switching elements SW of a negative-side leg are defined as VIXnN*.

Figure 5:
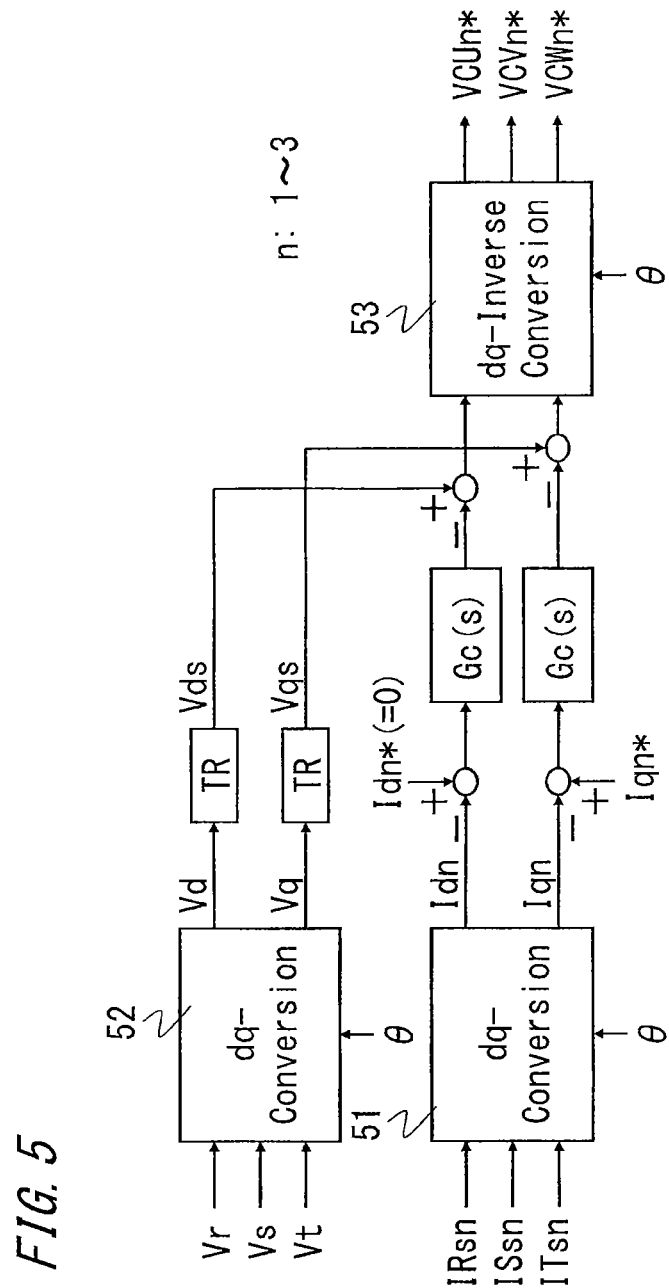
FIG. 5 is a block diagram showing an input-current control unit in the control circuit according to Embodiment 1.

A control block diagram showing an example of the input-current control unit 610 is shown in FIG. 5. A main purpose of the input-current control unit 610 is to cause the currents IRsn, ISsn, ITsn flowing through the input terminals R, S, T or in the secondary side of the transformers 20n, to follow their current command values. Regarding the three number of the converter cells 30Xn connected to one transformer 20n as one set, the input-current control unit 610 controls them independently of the other set.

First, the input currents IRsn, ISsn, ITsn of the converter cells 30Xn are detected. A dq converter 51 makes a dq-conversion using a power-source phase θ on these detection values, to thereby develop a d-axis current Idn and a q-axis current Iqn. In the followings, description will be made assuming a case where, when the power-source voltages are in three-phase equilibrium, the d-axis current corresponds to a reactive current (reactive power) and the q-axis current corresponds an active current (active power). Deviations between the acquired dq-axis currents Idn, Idq and their respective current command values Idn*, Iqn*, are calculated and provided to respective controllers Gc(s). The controllers Gc(s), to which a PI control or the like is applicable, perform calculation for making the deviations zero. Here, since Idn* is a command value corresponding to the reactive current, it is given as Idn*=0 so that the power factor becomes approx. 1, whereas, since Iqn* corresponds to the active current, it is developed by the average-voltage control unit 631 described later.

Meanwhile, the power-source voltages Vr, Vs, Vt are dq-converted by a dq converter 52, and are thereafter multiplied by a turn ratio TR of the transformer 20n, so that a d-axis voltage Vds and a q-axis voltage Vqs of the power-source voltages are acquired. Then, with respect to the outputs of the controllers Gc(s), the d-axis voltage Vds and the q-axis voltage Vqs of the power-source voltages are taken into consideration as a feedforward amount. The resultants are inversely dq-converted by a dq inverse converter 53, so that voltage commands values VCUn*, VCVn*, VCWn* in the converter 3a-side of the converter cells 30Xn are acquired. Note that, since the transformer 20n is connected to the converter 3a-side, for the purpose of preventing its magnetic saturation, it is required not to output a zero-phase voltage thereto. Instead, the magnetic saturation may be prevented by controlling the zero-phase voltage that is developed from a total sum of the input currents IRsn, ISsn, ITsn, to be zero.

The foregoing is an example, and in order not to cause interference between the d-axis and q-axis currents, it is possible to incorporate a publicly known method, such as a non-interference current control. Also, by using PQ-conversion instead of dq-conversion, it is possible to perform controlling while differentiating the active power P and the reactive power Q, more exactly.

Figure 6:
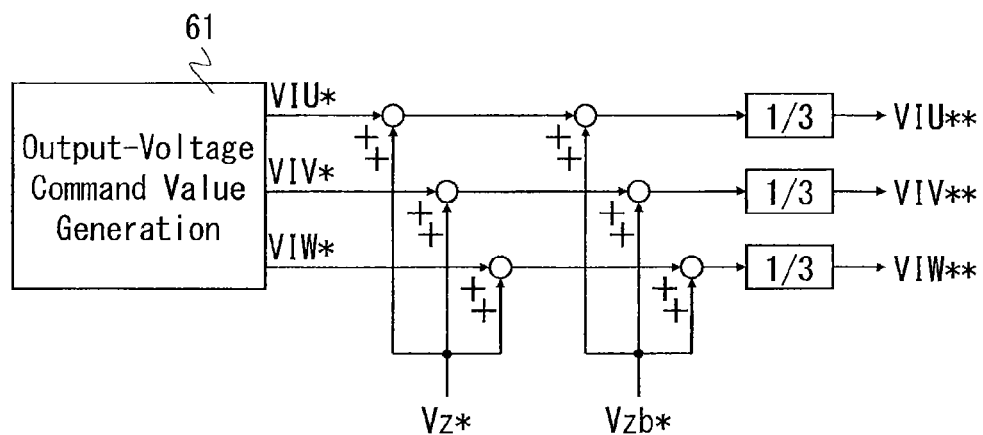
FIG. 6 is a block diagram showing an output-voltage control unit in the control circuit according to Embodiment 1.

Next, a control block diagram showing an example of the output-voltage control unit 620 is shown in FIG. 6. In FIG. 6, total-voltage command values VIU*, VIV*, VIW* for the respective phases in the inverter 3b-side, are acquired by a command value generation unit 61 using a publicly known motor control technique (for example, a constant V/f control, a vector control, a direct torque control, etc.). Further, a zero-phase voltage component Vz* having a three-fold output frequency is added to these voltage command values, so that the voltage-utilization ratio is enhanced.

Although the detail of this method is omitted here because of the method being publicly known itself, it is a method in which a common zero-phase voltage Vz* is added so that an amplitude of the a peak value portion of each phase in the inverter 3b-side is made smaller. By this addition, a deformation occurs in the voltage waveform; however, the deformed waveform is due to the zero-phase voltage, and thus, in the case of being supplied to a load in three-phase through three lines, only a well-formed sine wave after removal of the deformed portion of the waveform is each supplied as a voltage to the load.

Note that this method is not applied to the converter 3a-side. The reason is that, since the transformer 20n is connected to the converter 3a-side, in the transformer 20n, a magnetic flux emerges which does not allow the three-phase voltages to become totally zero when they are output after the addition of the zero-phase voltage, thereby causing a drawback that the fourth leg or the fifth leg of the core in the transformer 20n is required to be larger.

Thereafter, the output-voltage control unit 620 adds a zero-phase voltage command value Vzb* determined by the inter-phase balance control unit 632 described later, to the voltage command values, and then divides them by the number of the cells per one phase (=3), to thereby output VIU, VIV and VIW** as provisionally determined values per one cell in the inverter 3b-side.

The bus-voltage control unit 630 controls the DC bus voltages in each converter cell 30Xn to become predetermined voltages, by means of four control units 631 to 634 i.e. the average-voltage control unit 631, the inter-phase balance control unit 632, the intra-phase balance control unit 633, and the intra-cell balance control unit 634.

Figure 7:
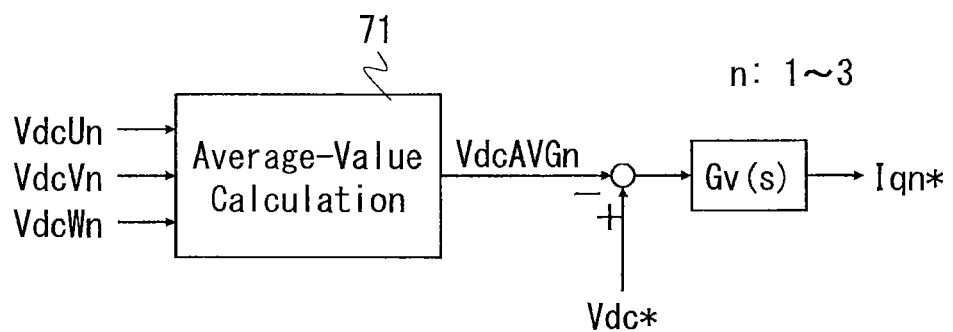
FIG. 7 is a block diagram showing an average-voltage control unit in the control circuit according to Embodiment 1.

A control block diagram showing an example of the average-voltage control unit 631 is shown in FIG. 7. In the average-voltage control unit 631, an average value of the DC bus voltages VdcUn, VdcVn, VdcWn in the three converter cells 30Xn connected to one transformer 20n, that is, an average value VdcAVGn over the three phases of U, V, W, is calculated by an average-value calculator 71.

Then, a q-axis current command values Iqn*, that corresponds to an input-current active component in the primary windings of the transformer 20n, is determined so that the average value VdcAVGn is caused to follow a predetermined bus voltage command value Vdc*. Specifically, a deviation between VdcAVGn and Vdc* is calculated, which is then provided to a controller Gv(s) where Iqn* is calculated. As the controller Gv(s), a PI controller or the like, may be used. Since Iqn* is a current corresponding to the active power, it is possible to cause VdcAVGn to follow Vdc*. Note that, when a PQ conversion is applied to the input-current control unit 610 as described above, a command value P* of the active power is adjusted.

With respect to the connections of converter cells 30Xn, the mutual converter cells 30Xn serially connected in the inverter 3b-side are connected in the converter 3a-side in parallel through the transformer 20n, and every common converter cells connected in mutually serial and parallel fashion are connected to a same phase. The average-voltage control unit 631 performs controlling while regarding the three number of the converter cells 30Xn connected to one transformer 20n as one set. As a result, when the average value of the DC bus voltages VdcAVGn is determined, voltage oscillations that emerge in the respective DC bus voltages become negated.

Generally, when a single-phase voltage is output, its output voltage oscillates in its two-fold frequency. Thus, the DC bus voltage also oscillates in the two-fold frequency.

Since the DC bus voltages VdcUn, VdcVn, VdcWn of the three converter cells 30Xn have their respective oscillation phases that are different by 120° to each other, they are negated in the three-phase average value VdcAVGn, so that the oscillation component of the two-fold frequency becomes zero. Thus, it is possible to realize the average-voltage control unit 631, more easily.

Figure 8:
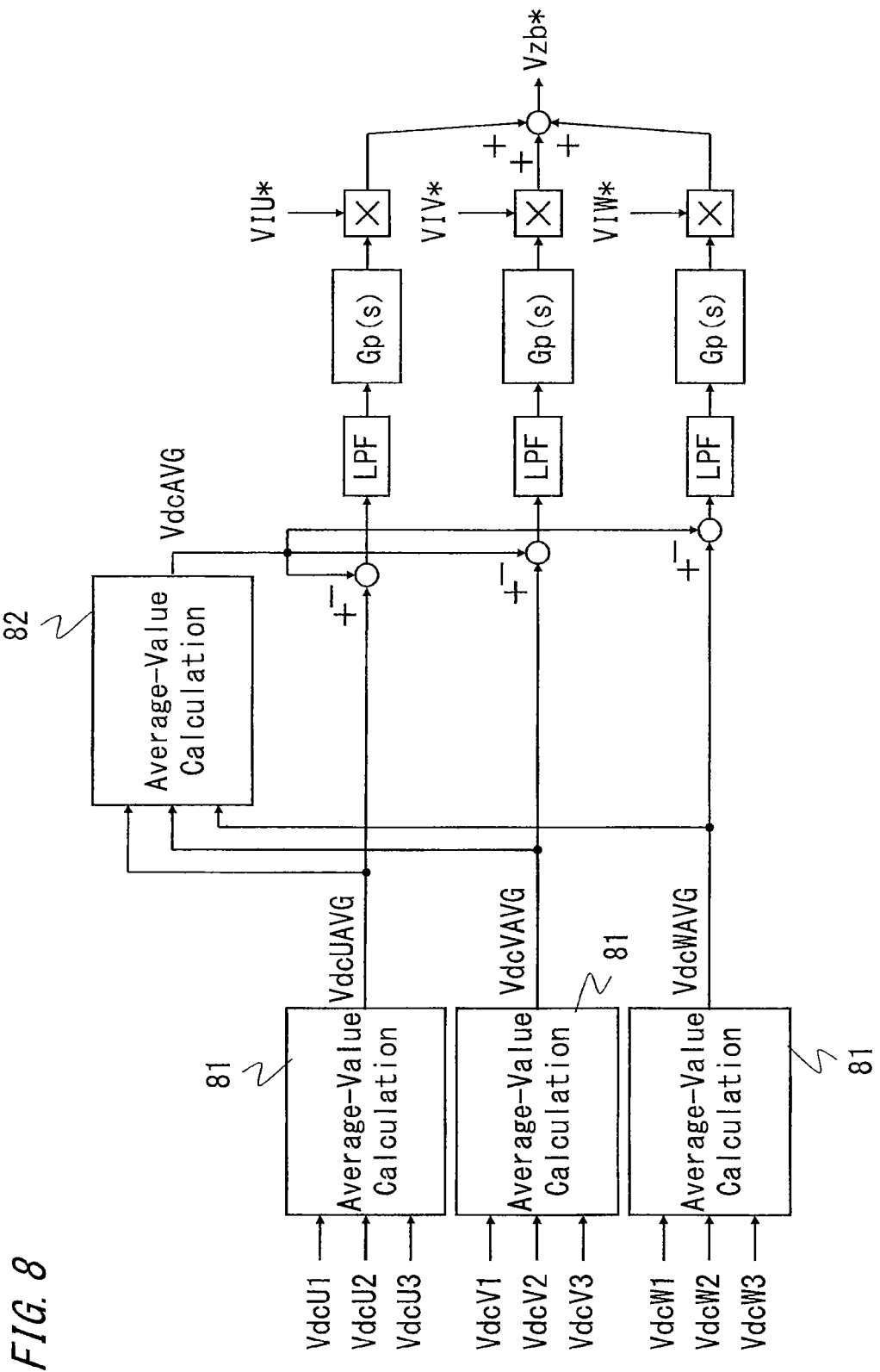
FIG. 8 is a block diagram showing an inter-phase balance control unit in the control circuit according to Embodiment 1.

Next, a control block diagram showing an example of the inter-phase balance control unit 632 is shown in FIG. 8. The inter-phase balance control unit 632 adjusts the zero-phase voltage Vzb* that overlaps the voltage command value for each phase in the inverter 3b-side (see, FIG. 6), to thereby balance the average voltages of the DC bus voltages in the respective phases: VdcUAVG (average value of VdcU1 to VdcU3), VdcVAVG (average value of VdcV1 to VdcV3) and VdcWAVG (average value of VdcW1 to VdcW3), evenly to each other.

Specifically, the average voltages of VdcUAVG, VdcVAVG, VdcWAVG in the respective phases are calculated by respective calculators 81, and the total average voltage VdcAVG is further calculated by a calculator 82. Then, the deviations between the average voltages of VdcUAVG, VdcVAVG, VdcWAVG in the respective phases and the total average voltage VdcAVG are respectively calculated, which are then provided to controllers Gp(s) through each LPF (Low Pass Filter). The zero-phase voltage command vale Vzb* is acquired by calculating the products of the outputs of the controllers Gp(s) and the voltage command values VIU*, VIV*, VIW* in the inverter 3b-side, respectively for each phase, followed by summing up the resultants. The reason of providing processing by the LPF is, as describe above, for removing the frequency component that has emerged in the DC bus voltage and is twice the output frequency. Note that, as the controller Gp(s), a PI controller or the like, may be used.

By controlling in such a manner, in the case of powering operation of the motor, a voltage of the phase where the average value of the DC bus voltages is decreased, becomes smaller, so that the output power of that phase becomes smaller and thus the DC bus voltages of the said phase are restored. As a result, the bus-voltage average values of all phases are balanced to each other.

Note that, in the case of regenerating operation of the motor, it is possible to deal with that case by reversing the polarity of the controller Gp(s).

Figure 9:
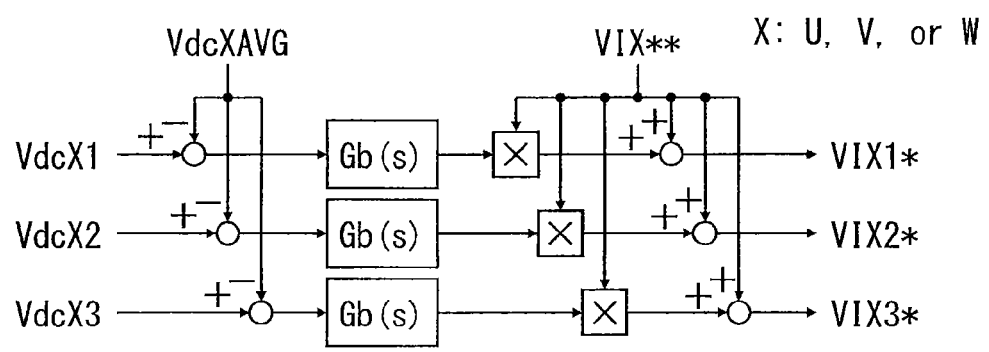
FIG. 9 is a block diagram showing an intra-phase balance control unit in the control circuit according to Embodiment 1.

Next, a control block diagram showing an example of the intra-phase balance control unit 633 is shown in FIG. 9. The intra-phase balance control unit 633 adjusts the shared output voltages of the inverters 3b in each phase, to thereby balance the DC bus voltages in the phase evenly to each other. Specifically, the deviations between the respective DC bus voltages VdcX1 to VdcX3 in the phase and the bus-voltage average value VdcXAVG in the phase are respectively calculated, which are then provided to controllers Gb(s). The resultants are equivalent to an adjusted ratio of the shared output voltages, so that adjustment ranges are developed by multiplying them respectively by the voltage command value VIX provisionally determined by the output-voltage control unit 620 (see, FIG. 6). By adding the adjustment ranges to VIX, the final voltage command values VIX1*, VIX2*, VIX3* are developed.

By controlling as described above, in the case of powering operation of the motor, an output voltage of the inverter 3b in the converter cell 30Xn whose DC bus voltage is relatively small, becomes smaller, so that the output power can be suppressed. As a result, the DC bus voltages in the phase can be balanced to each other.

Note that, in the case of regenerating operation of the motor, it is possible to deal with that case by reversing the polarity of the controller Gb(s).

Figure 10:
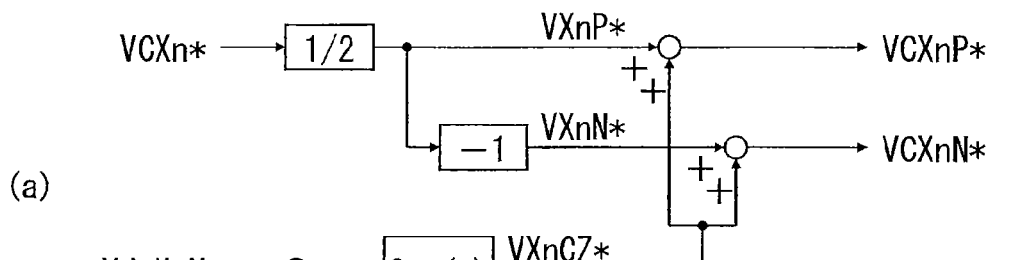
FIG. 10 is block diagrams each showing an intra-cell balance control unit according to the control circuit in Embodiment 1.
Figure 10:
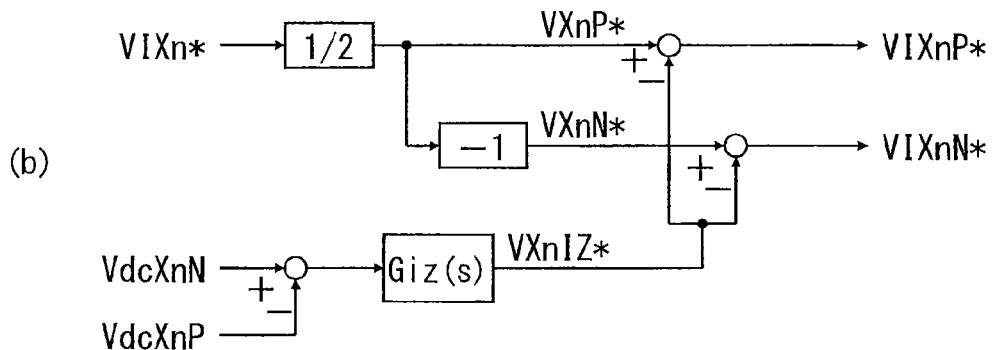

Next, an example of the intra-cell balance control unit 634 is shown in FIG. 10. The intra-cell balance control unit 634 serves to balance the positive-side DC bus voltage and the negative-side DC bus voltage evenly to each other, by adjusting the ratio of the voltages in the positive-side leg and the negative-side leg. This controlling can be realized by it being reflected on either one or both of the converter 3a-side and the inverter 3b-side.

First, description will be made with respect to the converter 3a-side, according to FIG. 10(a). By multiplying the voltage command value VCXn* of the converter 3a by ½, a voltage command value VXnP* of the positive-side leg is calculated, which is further multiplied by −1, so that a voltage command value VXnN* of the negative-side leg is calculated. Further, a deviation between a negative-side DC bus voltage VdcXnN, which is a voltage to be applied to the negative-side capacitor CN, and a positive-side DC bus voltage VdcXnP, which is a voltage to be applied to the positive-side capacitor CP, is calculated, which is then provided to a controller Gcz(s), so that VXnCz* is calculated. Thereafter, VXnCz* is added to the respective voltage command values VXnP*, VXnN*, respectively, so that the final voltage command value VCXnP* of the positive leg and the final voltage command value VCXnN* of the negative leg are calculated.

By controlling as described above, in the case of powering operation of the motor (in a state where power is input to the converter 3a), the voltage command value of the low-voltage capacitor side is increased, thereby making it possible to balance the DC bus voltages in the positive side and in the negative side.

Note that, in the case of regenerating operation of the motor, it is possible to deal with that case by reversing the polarity of the controller Gcz(s).

With respect to the inverter 3b-side shown in FIG. 10(b), the basic principle is the same. However, in the case of powering operation of the motor, since the inverter 3b is outputting power, final voltage command values VIXnP*, VCXnN* are calculated by subtracting VXnIZ* calculated by a controller Giz(s) from the respective voltage command values of the positive leg and negative leg. In the case of regenerating operation of the motor, this instance is also dealt with by reversing the polarity of the controller Giz(s).

Figure 11:
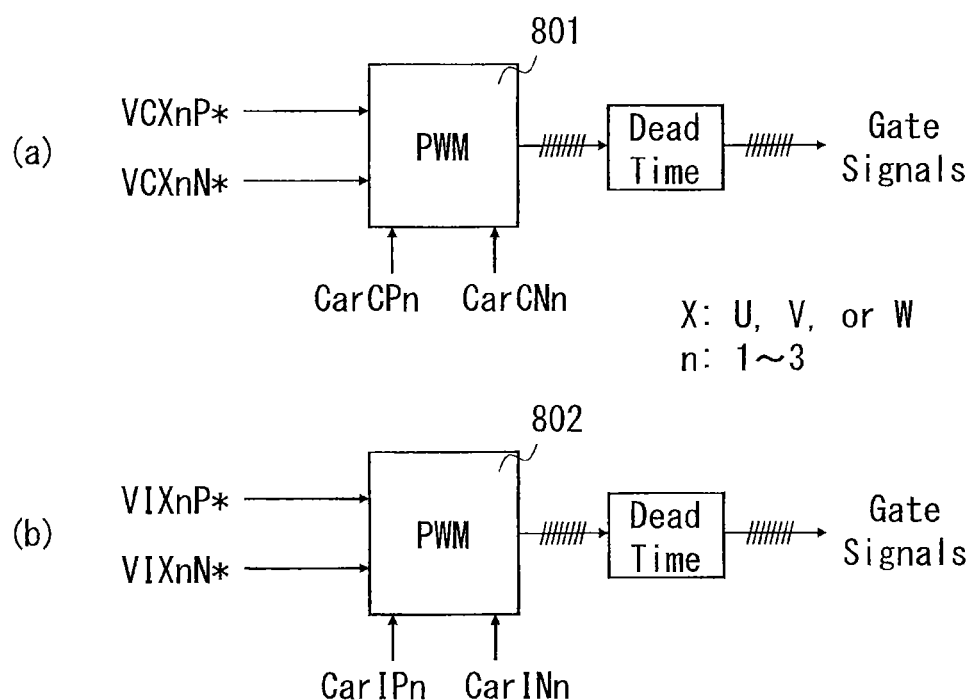
FIG. 11 is block diagrams each showing a modulation unit in the control circuit according to Embodiment 1.

Finally, the modulation unit 640 will be described below. FIG. 11 shows an example of controlling by the modulation unit 640; in particular, FIG. 11(a) shows the controlling for converter 3a-side and FIG. 11(b) shows the controlling for inverter 3b-side. The modulation unit 640 performs a pulse width modulation (PWM) on the basis of the voltage command values VCXnP*, VCXnN* in the converter 3a-side and the voltage command values VIXnP*, VIXnN* in the inverter 3b-side, which have been developed by the aforementioned respective control units 610 to 630, to thereby develop gate signals for controlling ON/OFF of the respective switching elements SW.

Specifically, the modulation unit provides the respective voltage command values to a PWM converter 801 (in the converter 3a-side) or a PWM converter 802 (in the inverter 3b-side), and further applies a dead time processing respectively to the resultants so that they have delays in their leading edges, to thereby output the gate signals for controlling ON/OFF of the respective switching elements SW.

When drawing attention to the one leg in the three-level conversion circuit, as its modulation means, there are various publicly-known examples, and the modulation means is not specifically limited by the invention. What is intended by the modulation unit 640 is: to cause the switching timings not to overlap between the positive-side leg and the negative-side leg, as much as possible; to cause the switching timings not to overlap between the converters 3a connected in parallel through the transformers 20n, as much as possible; and to cause the respective switching timings not to overlap between the serially connected inverters 3b; to thereby achieve the input current and/or output voltage with little harmonic component.

Figure 12:
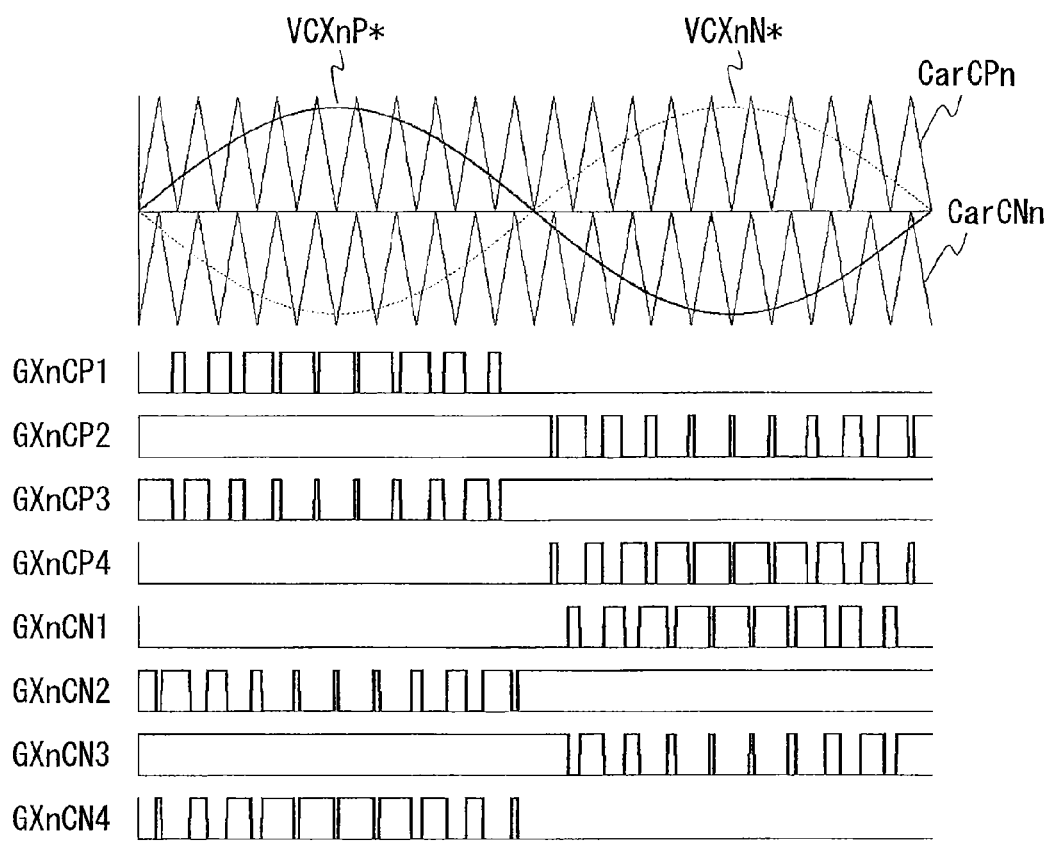
FIG. 12 is a timing chart illustrating an operation of a converter-side PWM controller according to Embodiment 1.
Figure 13:
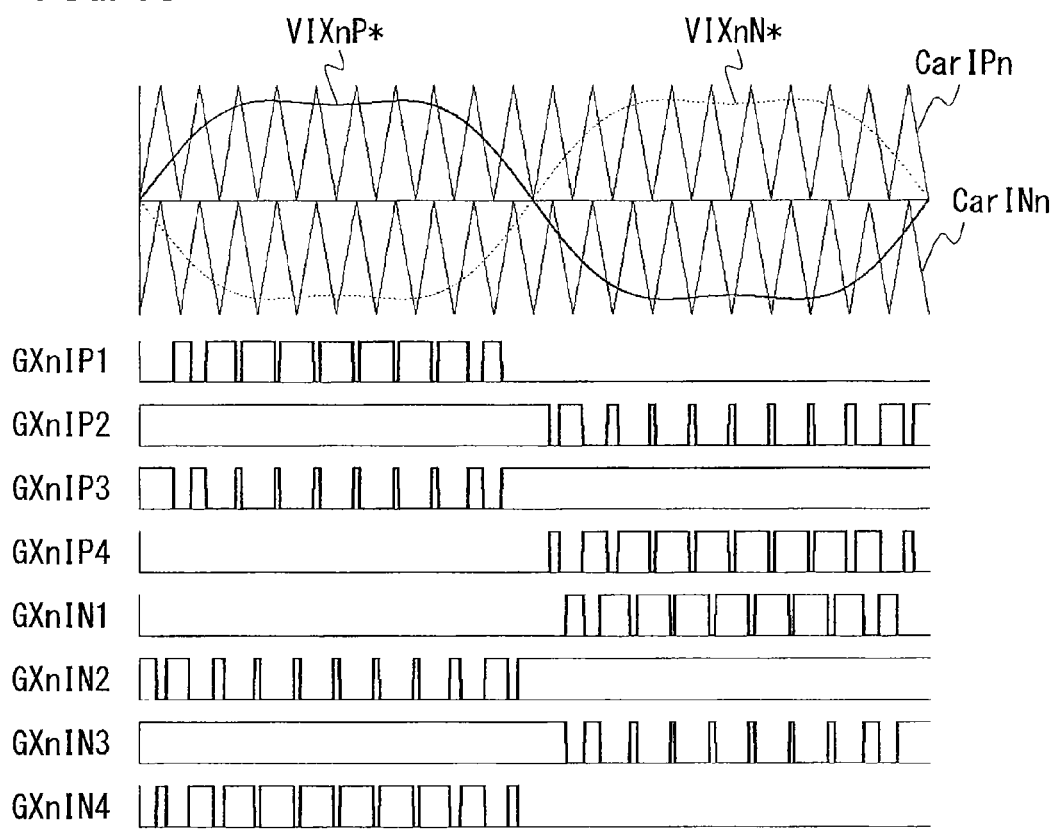
FIG. 13 is a timing chart illustrating an operation of an inverter-side PWM controller according to Embodiment 1.

In the followings, description will be made citing an exemplified case where the modulation is performed for each one leg by using a set of two triangle-wave carriers for a positive-voltage output and a negative-voltage output, on the basis of FIG. 12 and FIG. 13. FIG. 12 shows controlling in the converter 3a-side, and FIG. 13 shows controlling in the inverter 3b-side.

With respect to the leg in the converter 3a-side, as shown in FIG. 12, the triangle-wave carriers CarCPn, CarCNn are compared to the voltage command value VCXnP* of the positive-side leg and the voltage command value VCXnN* of the negative-side leg, respectively. The two triangle-wave carriers CarCPn, CarCNn, have the same phase, the amplitude of the triangle-wave carrier CarCPn for the positive-voltage output corresponds to a voltage across the positive-side capacitor CP in the converter cell 30Xn concerned, and the amplitude of the triangle-wave carrier CarCNn for the negative-voltage output corresponds to a voltage across the negative-side capacitor CN.

The gate signals to the respective four switching elements SW of the positive-side leg in the converter 3a-side, are defined as GXnCP1, GXnCP2, GXnCP3 and GXnCP4, in the order from the switching element SW in the side of the positive DC terminal. Further, the gate signals to the respective four switching elements SW of the negative-side leg, are defined as GXnCN1, GXnCN2, GXnCN3 and GXnCN4, in the order from the switching element SW in the side of the positive DC terminal.

The gate signals GXnCP1, GXnCP3 are determined from a magnitude relationship between the triangle-wave carrier CarCPn for the positive-voltage output and the voltage command value VCXnP* of the positive-side leg. The gate signals GXnCP2, GXnCP4 are determined from a magnitude relationship between the triangle-wave carrier CarCNn for the negative-voltage output and the voltage command value VCXnP* of the positive-side leg. The gate signals GXnCN1, GXnCN3 are determined from a magnitude relationship between the triangle-wave carrier CarCPn for the positive-voltage output and the voltage command value VCXnN* of the negative-side leg. The gate signals GXnCN2, GXnCN4 are determined from a magnitude relationship between the triangle-wave carrier CarCNn for the negative-voltage output and the voltage command value VCXnN* of the negative-side leg.

When the voltage command value is larger than the triangle-wave carrier, the positive-side switching element SW is turned ON and the negative-side switching element SW is turned OFF, whereas in the reverse case of magnitude relationship, ON/OFF operation is reversed. Finally, the dead time processing is applied to the respective gate signals so as to have delays in their leading edges, so that the final gate signals are determined. Because of being publicly known, the dead time processing is omitted from the description.

Likewise, with respect to the leg in the inverter 3b-side, as shown in FIG. 13, the triangle-wave carriers CarIPn, CarINn are compared to the voltage command value VIXnP* of the positive-side leg and the voltage command value VIXnN* of the negative-side leg, respectively. The two triangle-wave carriers CarIPn, CarINn, have the same phase, the amplitude of the triangle-wave carrier CarIPn for the positive-voltage output corresponds to the voltage across the positive-side capacitor CP in the converter cell 30Xn concerned, and the amplitude of the triangle-wave carrier CarINn for the negative-voltage output corresponds to the voltage across the negative-side capacitor CN.

Note that, in FIG. 13, the reason why the waveforms of the voltage command values VIXnP* and VIXnN* are deformed from a sine wave, is based on the addition of the zero-phase voltage component Vz* in the output-voltage control unit 620 described in FIG. 6.

The gate signals to the respective four switching elements SW of the positive-side leg in the inverter 3b-side, are defined as GXnIP1, GXnIP2, GXnIP3 and GXnIP4, in the order from the switching element SW in the side of the positive DC terminal. Further, the gate signals to the respective four switching elements SW of the negative-side leg, are defined as GXnIN1, GXnIN2, GXnIN3 and GXnIN4, in the order from the switching element SW in the side of the positive DC terminal.

The gate signals GXnIP1, GXnCI3 are determined from a magnitude relationship between the triangle-wave carrier CarIPn for the positive-voltage output and the voltage command value VIXnP* of the positive-side leg. The gate signals GXnIP2, GXnIP4 are determined from a magnitude relationship between the triangle-wave carrier CarINn for the negative-voltage output and the voltage command value VIXnP* of the positive-side leg. The gate signals GXnIN1, GXnIN3 are determined from a magnitude relationship between the triangle-wave carrier CarIPn for the positive-voltage output and the voltage command value VIXnN* of the negative-side leg. The gate signals GXnIN2, GXnIN4 are determined from a magnitude relationship between the triangle-wave carrier CarINn for the negative-voltage output and the voltage command value VIXnN* of the negative-side leg.

When the voltage command value is larger than the triangle-wave carrier, the positive-side switching element SW is turned ON and the negative-side switching element SW is turned OFF, whereas in the reverse case of magnitude relationship, ON/OFF operation is reversed. Finally, the dead time processing is applied, to thereby determine the final gate signals.

In the modulation unit 640, a phase relationship between the triangle-wave carriers is important. In a voltage output from the one leg, a harmonic component near the carrier frequency is dominant. When focusing on a single converter 3a or inverter 3b, the respective voltage command values of the positive-side leg and negative-side leg are in a nearly reverse relationship (negative-side value is calculated by multiplying "−1"), and thus the carrier frequency components are equivalently negated therebetween, so that a harmonic component having a near two-fold frequency of the carrier frequency becomes dominant.

Figure 14:
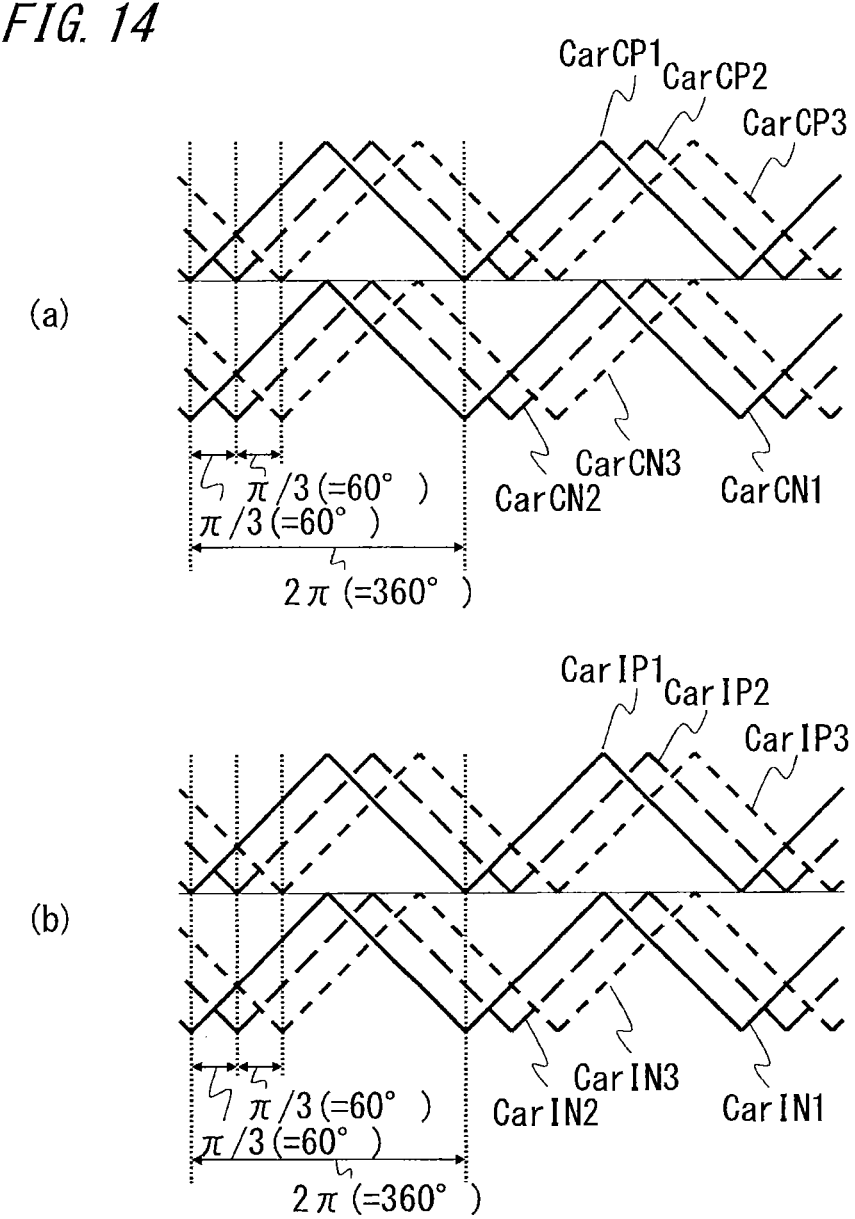
FIG. 14 is timing charts each illustrating a phase-relationship between triangle-wave carriers used in the PWM controller according to Embodiment 1.

Further, as each of the two triangle-wave carriers for the positive-voltage output and negative-voltage output, a plurality of triangle-wave carriers whose phases are shifted to each other may be used, description of which is made based on FIG. 14 as follows. FIG. 14(*a*) shows controlling in the converter 3a-side, and FIG. 14(*b*) shows controlling in the inverter 3b-side.

With respect to the converter 3a-side, by the triangle-wave carriers CarCP1, CarCP2, CarCP3 (CarCN1, CarCN2, CarCN3) whose phases are being shifted to each other by 60 degrees ($\pi/3$ rad) as shown in FIG. 14(*a*), it is possible to negate the harmonic component included in the input current and having near two-fold frequency of the carrier frequency. This finally results in such a harmonic component becoming dominant that has a near K1-fold frequency (K1=number of legs×multiplexed parallel number, in this case, 2×3=6) of the carrier frequency. Thus, a low-order harmonic component having a large amplitude can be negated, and therefore, it is possible to achieve an input current with little harmonic component.

Further, since the remaining harmonic component has a near six-fold frequency of the carrier frequency, which is a much higher frequency, it is easily removable by adding small filters in the input terminals or the converter 3a-side of the converter cell 30Xn.

On the other side, with respect to the inverter 3b-side, by the triangle-wave carriers CarIP1, CarIP2, CarIP3 (CarIN1, CarIN2, CarIN3) whose phases are being shifted to each other by 60 degrees ($\pi/3$ rad) as shown in FIG. 14(*b*), it is possible to negate the harmonic component included in the output voltage and having near two-fold frequency of the carrier frequency. This finally results in such a harmonic component becoming dominant that has a near K2-fold frequency (K2=number of legs×serially multiplexed number, in this case, 2×3=6) of the carrier frequency. Thus, a low-order harmonic component having a large amplitude can be negated, and therefore, it is possible to achieve an output voltage with little harmonic component.

Further, since the serial connections are provided in the inverter 3b-side, by shifting switching timings, it is possible to increase the output voltage levels according to the number of potentials that the capacitors have.

As described above, by using the power conversion device according to the invention, a conventional phase-shifting transformer which is complicated in structure becomes unnecessary. Further, by configuring the converter cell 30Xn to be a three or more-level converter, it is possible to reduce the number of the converter cells 30Xn and the number of windings in the transformer 20n, to thereby achieve downsizing, weight-saving and cost reduction. Further, because of using a self-commutated converter as the converter cell 30Xn, a regeneration operation is enabled. Furthermore, by the control circuit 601, magnetic saturation of the transformer 20n is suppressed, so that the DC bus voltage in the converter cell 30Xn is controlled properly, to thereby enhance the reliability.

Embodiment 2

Figure 15:
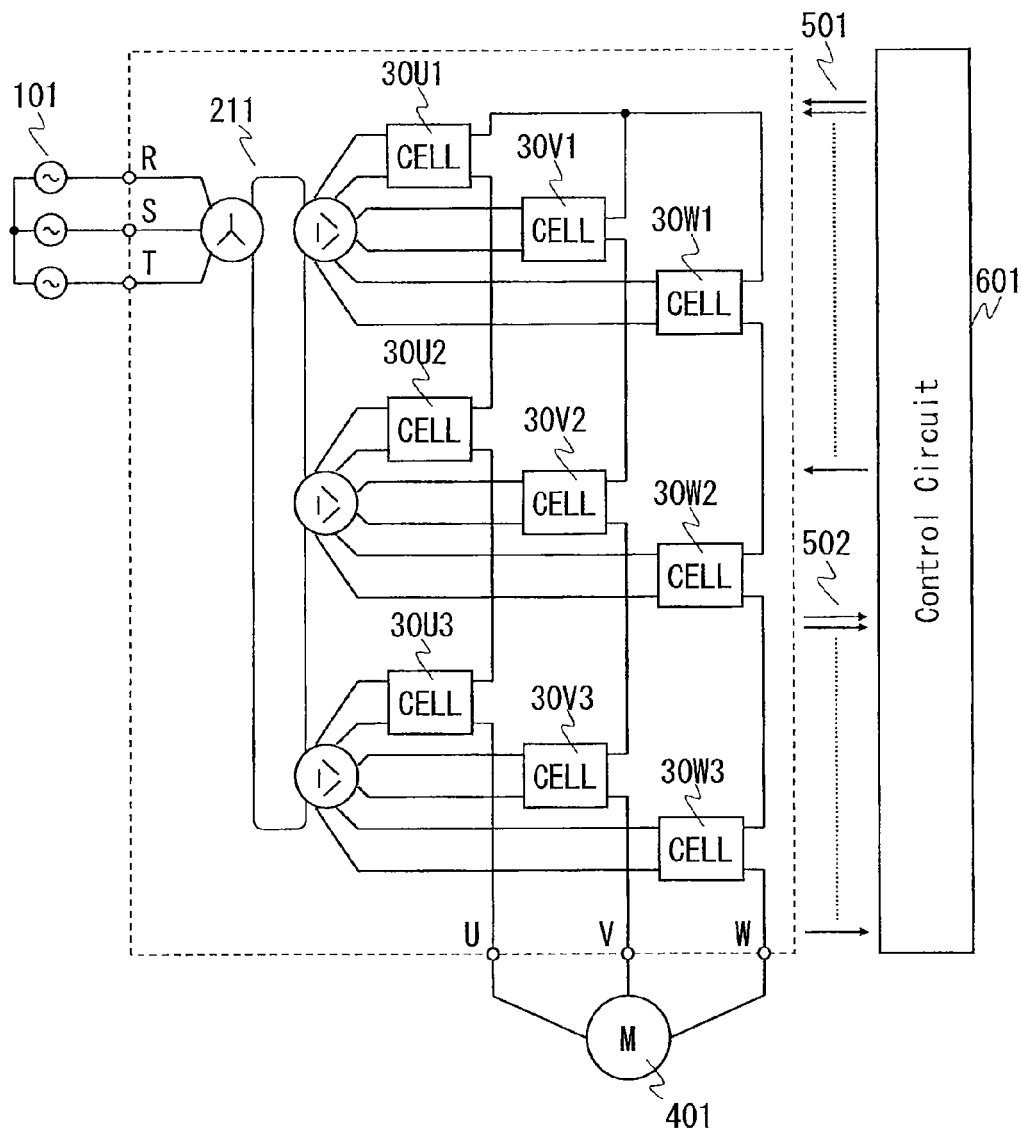
FIG. 15 is a circuit diagram showing a main circuit configuration of a power conversion device according to Embodiment 2 of the invention.

An example of a main circuit configuration of a power conversion device according to Embodiment 2 of the invention is shown in FIG. 15. In FIG. 15, the voltage-transformer device is different to the voltage-transformer device (transformers 20n) shown in FIG. 1 of Embodiment 1.

Figure 16:
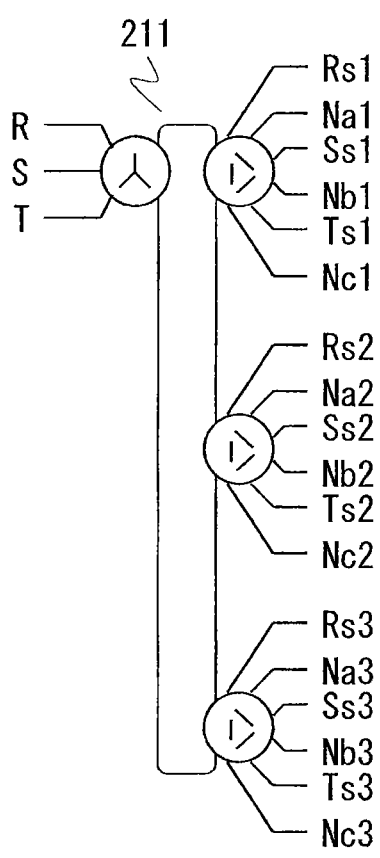
FIG. 16 is diagrams each showing a winding configuration of a transformer according to Embodiment 2.
Figure 16:
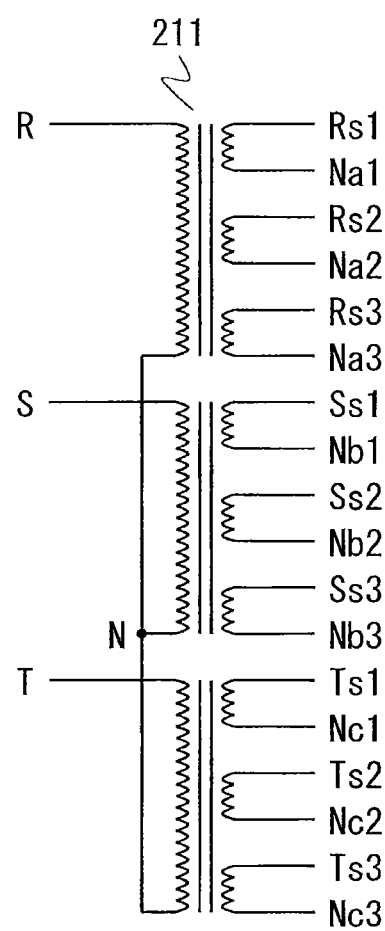

FIG. 16(*a*) is a diagram showing an example of wiring configuration of a transformer 211 as the voltage-transformer device according to Embodiment 2, a detailed configuration of which is shown in FIG. 16(*b*).

Like Embodiment 1, primary windings of the transformer 211 have a winding configuration of three-phase star connection (Y-connection). There are provided secondary windings comprising a plurality of windings (three, here) per one phase of the primary winding, to thereby have a configuration corresponding to that collecting the transformers 201, 202, 203 into the one transformer 211. The secondary windings comprises three single-phase open windings per one phase, so that by the one transformer 211, power sources comprising total nine single-phase open windings insulated to each other, are established.

By thus collecting the three transformer into one to thereby configure the voltage-transformer device by the one transformer 211, it is possible to achieve further reduction in size, weight and cost of the voltage-transformer device. Further, because of using the open windings as the secondary windings, by collecting the transformers, a more effect is exhibited. That is, flexibility is enhanced for the combination of controlling. In Embodiment 1, with respect to each set of converter cells 30Xn connected to one transformer 20n (for example, the set of 30U1, 30V1, 30W1), the input-current control unit 610 is used. In contrast, by collecting into one transformer 211, flexibility is enhanced for the combination of controlling; for example, it becomes allowable that the converter cells 30U1, 30V2, 30W3 be handled as one set. Thus, by utilizing such flexibility, it becomes possible to take an optimum design in consideration of insulation between the control lines and/or control signals, and the like.

Note that, like Embodiment 1, a three or more-leg core is usable as the core of the transformer, and it is desirable that the leakage inductance be given as about 5% or more.

Meanwhile, in Embodiments 1 and 2, although the leakage inductance of the transformer is considered to be about 5%, an additional reactor may be introduced. This may be introduced in the primary side of the transformer, or introduced in the secondary side thereof. By further addition of a capacitor, an LC filter may be introduced in the primary side or the secondary side. By thus adding the reactor or the LC filter, it is possible to further reduce a harmonic component in the input current.

Further, in Embodiments 1 and 2, it is assumed that an IGBT (Insulated Gate Bipolar Transistor) is used as the switching element SW; however, another type of switching element SW, such as a MOSFET (Meal Oxide Semiconductor Field Effect Transistor) or the like, may be used.

Meanwhile, although silicon is generally used as a material of the semiconductor element constituting the switching element SW and the diodes FD, CD, when a wide bandgap material, such as a silicon carbide, a gallium nitride family material or diamond, whose bandgap is wider than that of silicon, is used, it is possible to increase the breakdown voltage of the semiconductor element, so that the number of the aforementioned converter cells 30Xn can be further reduced. This further makes a switching speed faster, and thus it is possible to achieve an input current or an output voltage with more little harmonic component. The above effects are achieved by applying the wide bandgap material to either one of the switching element SW and the diodes FD, CD, or both of these semiconductor elements. Further, the effects are achieved by applying the material to either one or both of the converter 3a and the inverter 3b of the converter cell 30Xn.

It should be noted that unlimited combination of the respective embodiments, any modification of the embodiments and any omission in the embodiments may be made appropriately in the present invention without departing from the scope of the invention.

The invention claimed is:

1. A power conversion device which performs power conversion between input terminals of multi-phase AC and output terminals of multi-phase AC, comprising:
a voltage-transformer device including primary windings connected to the input terminals and secondary windings comprising pluralities of single-phase open windings that are insulated to each other;
a plurality of converter cells including switching elements, each converter cell of which input ends are connected to both ends of each single-phase open winding, the converter cells' respective input ends are connected in mutually parallel fashion to the input terminal of each phase through the voltage-transformer device, and the converter cells' respective output ends are connected in mutually serial fashion to the output terminal of each phase, said converter cells each performing conversion between a single-phase AC and another single-phase AC; and
a control circuit for controlling ON/OFF of the switching elements, the control circuit being configured to control a DC bus voltage in each of the converter cells to be evenly balanced to each other;
wherein the converter cells each comprise: a capacitor series connection; a converter that converts a single-phase AC voltage from the input ends into a three or more-level DC voltage and outputs it to the capacitor series connection; and an inverter that converts a DC voltage from the capacitor series connection into a single-phase AC voltage and outputs it to the output ends;
wherein the control circuit is configured to:
control a DC bus voltage that is a voltage of the capacitor series connection in each of the converter cells, to have a predetermined bus-voltage command value,
control an average value of the DC bus voltages of the converter cells connected to mutually different phases of the output terminals, and
control an input-current active component of the primary windings of the voltage-transformer device so that the average value becomes the predetermined bus-voltage command value.

2. The power conversion device of claim 1, wherein the control circuit is further configured to take a balance among the DC bus voltages of the converter cells connected to mutually different phases of the output terminals, and control voltage command values of the inverters in the converter cells so that the plural DC bus voltages are evenly balanced to each other.

3. The power conversion device of claim 1, wherein the control circuit is further configured to take a balance among the DC bus voltages of a plural number of the converter cells connected in mutually serial fashion in each phase of the output terminals, and control voltage command values of the inverters in the plural number of the converter cells so that the plural DC bus voltages are evenly balanced to each other.

4. The power conversion device of claim 1, wherein the capacitor serial connection is configured with a positive-side capacitor and a negative-side capacitor which are serially connected to each other, and the DC bus voltage of the converter cell is established by a positive-side DC bus voltage applied to the positive-side capacitor and a negative-side DC bus voltage applied to the negative-side capacitor; and
wherein the control circuit is further configured to take a balance between the positive-side DC bus voltage and the negative-side DC bus voltage in each of the converter cells, and control voltage command values of the switching elements that constitute at least one of the converter and the inverter so that the positive-side DC bus voltage and the negative-side DC bus voltage are evenly balanced to each other.

5. The power conversion device of claim 1, wherein the control circuit controls switching-timings of the switching elements that constitutes at least one of the converter and the inverter in each of a plural number of the converter cells connected in mutually serial fashion in each phase of the output terminals, to shift among the plural number of the converter cells so as to reduce a harmonic component that is contained in at least one of an input current to the input terminals and an output voltage from the output terminals.

6. The power conversion device of claim 1, wherein the voltage-transformer device is configured by a plurality of transformers whose respective ones of the primary windings are connected in parallel to the input terminals.

7. The power conversion device of claim 1, wherein the voltage-transformer device is configured by a single transformer including second wirings, a plural number of which are given per one of the primary windings in one phase.

8. The power conversion device of claim 1, wherein numbers of phases of the multi-phase AC of the input terminals and the multi-phase AC of the output terminals are equal to each other, and
wherein the input ends of a plural number of the converter cells whose output ends are connected in mutually serial fashion to the output terminal, are connected in mutually parallel fashion, through the voltage-transformer device, to the input terminal whose phase is the same as the phase of the output terminal to which said input ends are connected.

9. The power conversion device of claim 1, wherein the multi-phase AC is a three-phase current, and the primary windings of the voltage-transformer device are provided in three-phase star connection.

10. The power conversion device of claim 1, wherein at least one of the switching elements and diodes which constitute at least one of circuits of the converter and the inverter in each of the converter cells, are formed of a wide bandgap semiconductor material that is wider in bandgap than silicon.

11. The power conversion device of claim 5, wherein the control circuit is configured to perform a PWM control using a carrier signal, and control the switching-timings of the switching elements to shift among the plural number of the converter cells, by shifting a phase of the carrier signal among the plural number of the converter cells.

12. The power conversion device of claim 9, wherein a core of the voltage-transformer device is configured with more than three-leg cores.

13. The power conversion device of claim 10, wherein the wide bandgap semiconductor material is a silicon carbide, a gallium nitride family material or diamond.

14. A power conversion device which performs power conversion between input terminals of multi-phase AC and output terminals of multi-phase AC, comprising:
a voltage-transformer device including primary windings connected to the input terminals and secondary windings comprising pluralities of single-phase open windings that are insulated to each other;
a plurality of converter cells including switching elements, in which their input ends are connected to the respective single-phase open windings, and their output ends are connected in mutually serial fashion to the output terminal of each phase, said converter cells each performing conversion between a single-phase AC and another single-phase AC; and
a control circuit configured to control a DC bus voltage that is a voltage of a capacitor series connection in each of said converter cells, to have a predetermined bus-voltage command value, take a balance among DC bus voltages of the converter cells connected to mutually different phases of the output terminals, and control voltage command values of inverters in said converter cells so that the DC bus voltages are evenly balanced to each other for controlling ON/OFF of the switching elements, the control circuit including a bus-voltage control unit which controls the DC bus voltage that is the voltage of the capacitor series connection in each of the converter cells, to have the predetermined bus-voltage command value, the bus-voltage control unit having an inter-phase balance control unit which takes the balance among the DC bus voltages of the converter cells connected to mutually different phases of the output terminals, and the inter-phase balance control unit which controls the voltage command values of the inverters in the converter cells so that the DC bus voltages are evenly balanced to each other,
wherein the converter cells each comprise: the capacitor series connection; a converter that converts a single-phase AC voltage from the input ends into a three or more-level DC voltage and outputs the three or more-level DC voltage to the capacitor series connection; and an inverter that converts a DC voltage from the capacitor series connection into a single-phase AC voltage and outputs the single-phase AC voltage to the output ends.

15. The power conversion device of claim 14, wherein the bus-voltage control unit comprises an intra-phase balance control unit which takes a balance among the DC bus voltages of a plural number of the converter cells connected in mutually serial fashion in each phase of the output terminals, and the intra-phase balance control unit controls voltage command values of the inverters in the plural number of the converter cells so that the plural DC bus voltages are evenly balanced to each other.

16. A power conversion device which performs power conversion between input terminals of multi-phase AC and output terminals of multi-phase AC, comprising:
a voltage-transformer device including primary windings connected to the input terminals and secondary windings comprising pluralities of single-phase open windings that are insulated to each other;
a plurality of converter cells including switching elements, in which their input ends are connected to the respective single-phase open windings, and their output ends are connected in mutually serial fashion to the output terminal of each phase, said converter cells each performing conversion between a single-phase AC and another single-phase AC; and
a control circuit configured to control a DC bus voltage that is a voltage of a capacitor series connection in each of said converter cells, to have a predetermined bus-voltage command value, take a balance between a positive-side DC bus voltage and a negative-side DC bus voltage in each of said converter cells, and control voltage command values of the switching elements that constitute at least one of a converter and an inverter so that the positive-side DC bus voltage and the negative-side DC bus voltage are evenly balanced to each other for controlling ON/OFF of the switching elements, the control circuit including a bus-voltage control unit which controls the DC bus voltage that is the voltage of the capacitor series connection in each of the converter cells, to have the predetermined bus-voltage command value, wherein the converter cells each comprise: the capacitor series connection; a converter that converts a single-phase AC voltage from the input ends into a three or more-level DC voltage and outputs the three or more-level DC voltage to the capacitor series connection; and an inverter that converts a DC voltage from the capacitor series connection into a single-phase AC voltage and outputs the single-phase AC voltage to the output ends;

the capacitor serial connection is configured with a positive-side capacitor and a negative-side capacitor which are serially connected to each other, and the DC bus voltage of the converter cell is established by a positive-side DC bus voltage applied to the positive-side capacitor and a negative-side DC bus voltage applied to the negative-side capacitor; and the bus-voltage control unit comprises an intra-cell balance control unit which takes the balance between the positive-side DC bus voltage and the negative-side DC bus voltage in each of the converter cells, and the intra-cell balance control unit controls the voltage command values of the switching elements that constitute at least one of the converter and the inverter so that the positive-side DC bus voltage and the negative-side DC bus voltage are evenly balanced to each other.

* * * * *